(12) United States Patent
Yang et al.

(10) Patent No.: US 12,696,000 B2
(45) Date of Patent: Jul. 28, 2026

---

(54) ELECTRONIC APPARATUS, CONTROL METHOD, CONTROL APPARATUS, AND SYSTEM TO IMPROVE INTERACTION EXPERIENCE OF A USER

(71) Applicant: Yinwang Intelligent Technologies Co., Ltd., Shenzhen (CN)

(72) Inventors: Jinghuan Yang, Shanghai (CN); Teng Li, Shenzhen (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/746,540

(22) Filed: Jun. 18, 2024

(65) Prior Publication Data

US 2024/0340543 A1 Oct. 10, 2024

Related U.S. Application Data

(63) Continuation of application No. PCT/CN2022/128599, filed on Oct. 31, 2022.

(30) Foreign Application Priority Data

Dec. 20, 2021 (CN) .......................... 202111566806.3

(51) Int. Cl.
| | |
|---|---|
| *H04N 23/90* | (2023.01) |
| *B60R 1/28* | (2022.01) |
| *B60R 1/29* | (2022.01) |
| *G03B 11/00* | (2021.01) |
| *H04N 23/695* | (2023.01) |

(52) U.S. Cl.
CPC .............. *H04N 23/90* (2023.01); *B60R 1/28* (2022.01); *B60R 1/29* (2022.01); *G03B 11/00* (2013.01); *H04N 23/695* (2023.01)

(58) Field of Classification Search
CPC ........ B60R 21/01538; B60R 21/01552; B60R 2021/01211; B60R 16/037; B60R 2021/0032; B60R 2021/006; B60R 21/16; B60R 11/02
USPC ......................................................... 348/148
See application file for complete search history.

(56) References Cited

U.S. PATENT DOCUMENTS

| | | | |
|---|---|---|---|
| 9,172,903 B1 | 10/2015 | Englander et al. | |
| 2015/0189241 A1 | 7/2015 | Kim et al. | |
| 2017/0136963 A1 | 5/2017 | Carson | |

(Continued)

FOREIGN PATENT DOCUMENTS

| | | |
|---|---|---|
| CN | 109720277 A | 5/2019 |
| WO | 2020170916 A1 | 8/2020 |

*Primary Examiner* — Masum Billah
(74) *Attorney, Agent, or Firm* — WOMBLE BOND DICKINSON (US) LLP

(57) ABSTRACT

Embodiments of this application provide a method, an apparatus, and a system, which may be applied to the intelligent cockpit field. The apparatus includes a body having a first surface and a second surface, where a first function element is disposed on the first surface, a second function element is disposed on the second surface, and there is an included angle between the first surface and the second surface, so that when the first function element covers a first function area, the second function element covers a second function area. The foregoing solution can improve a reuse rate of a function element, reduce design costs and implementation difficulties, and improve operation experience of a user.

14 Claims, 15 Drawing Sheets

(56)  References Cited

U.S. PATENT DOCUMENTS

| | | | |
|---|---|---|---|
| 2019/0246036 A1 | 8/2019 | Wu et al. | |
| 2020/0172124 A1* | 6/2020 | Kapuria | G01S 17/86 |
| 2020/0186751 A1* | 6/2020 | Tran | G06N 3/045 |
| 2021/0382969 A1 | 12/2021 | Park | |

* cited by examiner

Television 20

Camera 201

Display 202

Answer    Reject    Mute

Electronic apparatus 30

First included angle

First function element 3011A

Second function element 3012A

Body 301

First surface 3011

Second surface 3012

First surface 3011

Second surface 3012

First surface 3011

Second surface 3012

First included angle

Electronic apparatus 30

Electronic apparatus 30

Electronic apparatus 30

Body
301

Support
body 302

Electronic apparatus 30

Electronic apparatus 110

In-cockpit visual function area

Radar
function area

Display
function area

Driver
interaction
function
area

Mechanical
driving area

Electronic apparatus 110

Out-cockpit
visual
function area

Electronic apparatus 130

In-cockpit
visual camera

Out-cockpit
visual camera

Driver
interaction
camera

Millimeter-wave
radar

Electronic apparatus 130

Support
body

Electronic apparatus 150

Out-cockpit
visual camera

In-cockpit
visual camera

Central
display
screen

Electronic apparatus 30

Screen

Electronic apparatus 30

Back of a screen

Electronic apparatus 30

Screen

System 210

FIG. 22

Method 2400

Control apparatus 2500

1

ELECTRONIC APPARATUS, CONTROL METHOD, CONTROL APPARATUS, AND SYSTEM TO IMPROVE INTERACTION EXPERIENCE OF A USER

CROSS-REFERENCE TO RELATED APPLICATIONS

This application is a continuation of International Application No. PCT/CN2022/128599, filed on Oct. 31, 2022, which claims priority to Chinese Patent Application No. 202111566806.3, filed on Dec. 20, 2021. The disclosures of the aforementioned applications are hereby incorporated by reference in their entireties.

TECHNICAL FIELD

Embodiments of this application relate to the intelligent field, and in particular, to a human-machine interaction method, apparatus, and system.

BACKGROUND

As a quantity of electronic devices increases, human-machine interaction (HMI) has gradually become a hot topic of user discussion. An HMI manner also gradually evolves from a manner of inputting a command line on a computer for interaction to a manner of a button input, a touch input, a voice instruction input, an air gesture, and the like. HMI experience has gradually become an important part of user experience and an important factor that affects user purchase. For example, not limited to a button input and touch control on a conventional mobile phone, a user may use a voice instruction to remotely control a mobile phone to play music, and may further use an air gesture to switch a currently played video. For another example, the user is no longer limited to perform touch control on a touchscreen, and an air gesture is gradually applied to human-machine interaction in the field of intelligent vehicles.

SUMMARY

Embodiments of this application provide a solution, including an electronic apparatus, a control method, a control apparatus, and a system, to improve interaction experience of a user.

Solutions provided in embodiments of this application may be applied to an automobile cockpit scenario, or may be applied to a smart home scenario. The control method provided in embodiments of this application may be performed by the control apparatus. The control apparatus may be an entire computing device, or may be some component in the computing device, for example, a chip. Specifically, the control apparatus may be a terminal such as a vehicle or an in-vehicle device (such as an automobile head unit), or may be another chip such as a system chip (also referred to as a system on chip, or referred to as an SoC chip) or a processing chip that can be disposed in the terminal. During physical implementation, the another chip such as the processing chip may be inherited in the system chip, or may not be integrated with the system chip.

According to a first aspect, an embodiment of this application provides an electronic apparatus, including: a body, where the body includes a first surface and a second surface; a first function element is disposed on the first surface, and a second function element is disposed on the second surface; and there is a first included angle between the first surface and the second surface, so that when the first function element covers a first function area, the second function element covers the second function area.

Herein, the electronic apparatus may be an independent apparatus, or may be connected to another apparatus to form an apparatus or a system. For example, the electronic apparatus may be independently placed at a location such as a center console in a car cockpit. Alternatively, the electronic apparatus may be suspended near an inner rear-view mirror area. Alternatively, the electronic apparatus may be fastened to an in-vehicle central display screen by using a connection structure, to form a system.

In one embodiment, the first function element and the second function element are image collection apparatuses, the first function element is configured to collect image information of a driving area, and the second function element is configured to collect image information of a cockpit area.

In one embodiment, the first included angle is greater than 145 degrees and less than 160 degrees. Alternatively, the first included angle is greater than 140 degrees and less than 150 degrees. It should be understood that the first included angle should be disposed such that both the first function element and the second function element can serve a same user. For example, both a DMS camera and a CMS camera may collect image information of a driving area, and the CMS camera may further collect image information of another area other than the driving area. In other words, the CMS camera may further collect image information of a driver and another user.

In one embodiment, the body further includes a third surface, a third function element is disposed on the third surface, where the third function element covers a third function area; and the second function area and the third function area overlap.

In one embodiment, a third function element is further disposed on the second surface, where the third function element covers a third function area; and the second function area and the third function area overlap.

In one embodiment, the body further includes a fourth surface, a fourth function element is disposed on the fourth surface, an included angle between extension lines of the fourth surface and the second surface is an acute angle, and the fourth function element is configured to collect image information outside a cockpit.

The fourth function element may be a DVR camera, and the fourth function element may be configured to record travel information.

In one embodiment, the apparatus further includes a support body, where the support body is configured to connect the body to a hardware apparatus in the cockpit.

The hardware apparatus may be one or more of hardware apparatuses in the cockpit, such as a display, a rear-view mirror, a multimedia component, a central control area (for example, a center console), or a dome light.

In one embodiment, the human-machine interaction apparatus is disposed in an upper area of the cockpit, and an included angle between an optical axis of the second function element and a horizontal line is greater than 10 degrees and less than 30 degrees.

In one embodiment, the support body is further configured to drive, in a privacy mode, the first function element and the second function element to fall. In embodiments of this application, lifting and lowering of the function element may be flipping, or may be vertical. Alternatively, the privacy mode may be that a user has a privacy requirement, and in a specific implementation process, there may be no specific mode.

In one embodiment, the support body is further configured to drive the first function element and the second function element to fall when a vehicle is turned off. In this way, power consumption can be reduced and security can be ensured. In this case, the fourth function element may not fall, and continue to work according to a user requirement.

In one embodiment, a field of view FOV of the first function element is greater than 60 degrees, and a field of view FOV of the second function element is greater than 100 degrees. It should be understood that parameter selection of a function element is mainly determined based on a range of a function area. Herein, a function element with another field of view may alternatively be selected, provided that the function element can cover the function area.

In one embodiment, the apparatus further includes a blocking structure configured to block the first function element and the second function element. The blocking structure may be further configured to block another function element. This is not limited in this application.

According to a second aspect, an embodiment of this application provides a control method, including:

obtaining pose information of an electronic apparatus;
receiving a first instruction in response to enabling of a first function of the electronic apparatus, where the first function corresponds to a first object; and adjusting a pose of the electronic apparatus according to the first instruction and based on the pose information, so that a function area of a first function element corresponding to the first function covers the first object.

In one embodiment, the first function further corresponds to a second object; and the pose of the electronic apparatus is adjusted according to the first instruction and based on the pose information, so that the function area of the first function element corresponding to the first function covers the first object and the second object.

In one embodiment, the first function further corresponds to a second function element; and the pose of the electronic apparatus is adjusted according to the first instruction and based on the pose information, so that the function area of the first function element corresponding to the first function covers the first object, and a function area of the second function element covers the first object.

According to a third aspect, an embodiment of this application provides a control apparatus, including a processor and an interface circuit, where the processor obtains, by using the interface circuit, instructions stored in a memory, so that the processor performs the method according to any one of the second aspect and the possible implementations.

According to a fourth aspect, an embodiment of this application provides a computer storage medium, including computer instructions. When the computer instructions are run on an electronic device, the electronic device performs the control method according to any one of the second aspect and the possible implementations.

According to a fifth aspect, an embodiment of this application provides a computer program product. When the computer program product runs on a computer, the computer performs the method according to any one of the second aspect and the possible implementations.

According to a sixth aspect, an embodiment of this application provides a system, including the electronic apparatus according to the first aspect and any possible implementation, and/or the control apparatus according to the third aspect. The system may be an in-vehicle system or a vehicle.

It should be understood that design details and beneficial effects of the aspects and the possible implementations may be mutually referenced. Details are not described herein again.

In the solutions provided in embodiments of this application, function elements on different surfaces may be used to cover different function areas, to improve richness of human-machine interaction. There is a first included angle between the first surface and the second surface in a design, so that the first function element covers the first function area, and the second function element covers the second function area. In this way, design costs and implementation difficulties of the electronic apparatus can be reduced while an integrated design is ensured. The electronic apparatus can meet a privacy requirement of the user through a shielding design. Through a pose adjustment design of the electronic apparatus, a function element with a good parameter can be reused to a greater extent, to reduce costs. A structure design in which function elements may not be lifted or lowered at the same time is used, to improve flexibility of use. When a vehicle is turned off, the function elements are lowered, so that power consumption can be reduced and standby duration can be increased.

BRIEF DESCRIPTION OF DRAWINGS

FIG. 22 is a schematic diagram of a structure of a system according to an embodiment of this application;

It should be understood that, in the foregoing schematic diagrams of structures, sizes and forms of block diagrams are for reference only, and shall not constitute exclusive interpretations to embodiments of the present application. Relative locations and inclusion relationships between the block diagrams shown in the schematic diagrams of structures only schematically represent structural associations between the block diagrams, rather than limiting physical connection modes in embodiments of the present application.

DESCRIPTION OF EMBODIMENTS

The following further describes the technical solutions provided in this application with reference to the accompanying drawings and embodiments. It should be understood that system architectures and service scenarios in embodiments of this application are mainly intended to describe possible implementations of the technical solutions of this application, and should not be construed as a unique limitation on the technical solutions of this application. A person of ordinary skill in the art may learn that the technical solutions provided in this application are also applicable to a similar technical problem as a system structure evolves and a new service scenario emerges.

It should be understood that human-machine interaction solution provided in embodiments of this application includes a human-machine interaction method, apparatus, and system. Because problem-resolving principles of the technical solutions are the same or similar, in the following descriptions of specific embodiments, some repeated parts may not be described herein, but it should be considered that the specific embodiments are mutually referenced and may be combined with each other.

With the development of economy and the rapid increase of a quantity of vehicles, vehicle technology and computer technology are more and more integrated. Intelligent vehicles have become a new trend of vehicle development. In addition to technologies such as an automatic driving technology and a high-precision map technology, a human-machine interaction technology of an intelligent cockpit has also become a hot technology that attracts much attention.

Figure 1:
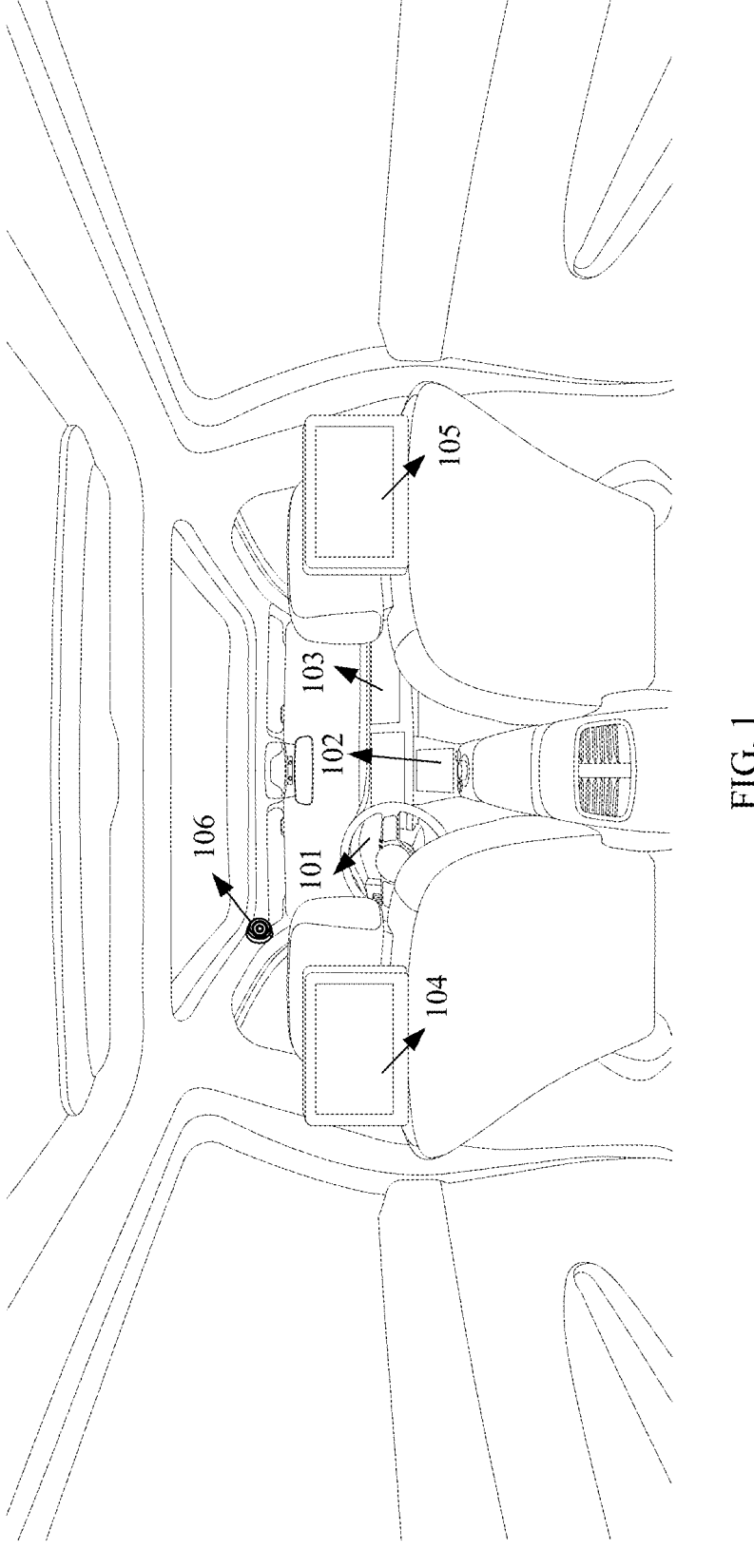
FIG. 1 is a schematic diagram of a structure of an interior of an automobile according to an embodiment of this application.

FIG. 1 is a schematic diagram of an interior structure of a vehicle cockpit according to an embodiment of this application. In the vehicle cockpit, an automobile head unit, also referred to as an in-vehicle audio and video infotainment system, may be disposed in a central control area of a vehicle, and a screen connected to the automobile head unit may also be referred to as a central display screen. With gradual expansion of digital display in cockpits, in some vehicles, a plurality of displays or a large screen that can be split-screened is disposed in the cockpits, to display content such as a digital dashboard and an in-vehicle infotainment system. As shown in FIG. 1, a plurality of displays are disposed in the cockpit, including a digital instrument display 101, a central display screen 102, an infotainment display 103 located in front of a front passenger, and an infotainment display 104 and an infotainment display 105 in front of passengers in a rear row. To implement different visual functions in the cockpit, a plurality of independent cameras 106 generally need to be installed at different locations in the cockpit, for example, at locations such as an A-pillar, a B-pillar, a steering column, a central control area, an internal rear-view mirror area, and a steering wheel area. This makes a design in the cockpit and camera deployment angles complicated.

Figure 2:
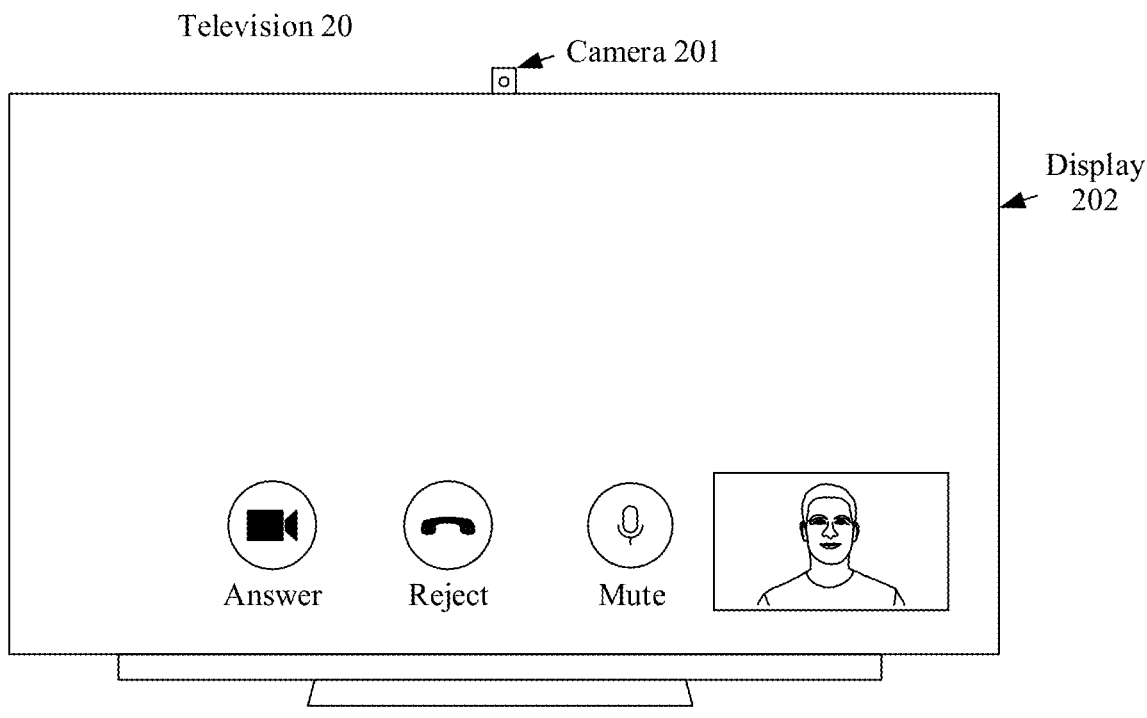
FIG. 2 is a schematic diagram of a structure of a television according to an embodiment of this application.

FIG. 2 is a schematic diagram of a structure of a television according to an embodiment of this application. With intelligent and digital development of televisions, televisions can be used not only for watching videos, but also for implementing functions such as games, video conferences, and photographing. Refer to FIG. 2. A camera 201 and a display 202 may be installed on a television 20. The camera 201 may be configured to collect image information of a user and an environment around the user, and the display 202 may be used for displaying. For a television that uses one camera, there may be an edge distortion of a captured user image, and a visual perception is poor.

Therefore, to improve human-machine interaction experience, an embodiment of this application provides a human-machine interaction solution.

FIG. 3 and FIG. 5 to FIG. 7 are schematic diagrams of structures of electronic apparatuses according to embodiments of this application. FIG. 4 is a schematic diagram of a first included angle according to an embodiment of this application. The electronic apparatus may be used for human-machine interaction, or may be referred to as a human-machine interaction apparatus. The electronic apparatuses shown in FIG. 3 and FIG. 5 to FIG. 7 may be a same electronic apparatus. For design details and effective effects, refer to each other. For brevity of description, details are not described in the following.

Figure 3:
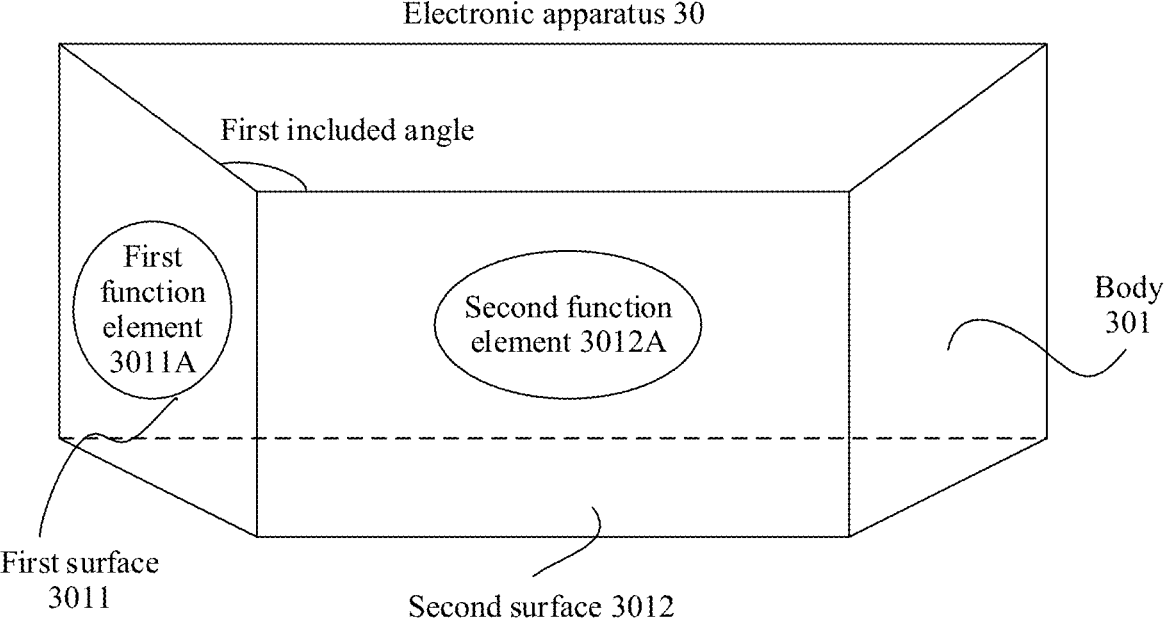
FIG. 3 is a schematic diagram of a structure of an electronic apparatus according to an embodiment of this application.
Figure 4:
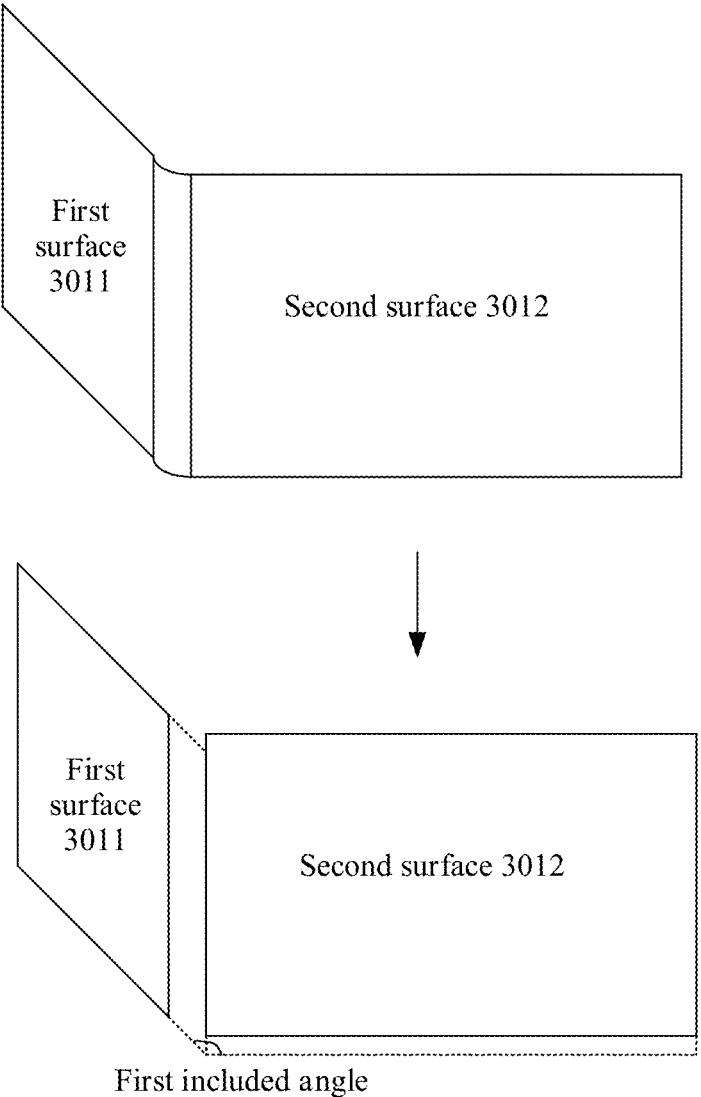
FIG. 4 is a schematic diagram of a structure of an electronic apparatus according to an embodiment of this application.

As shown in FIG. 3, an electronic apparatus 30 includes a body 301, and the body 301 includes a plurality of surfaces. A function element may be disposed on any one of the plurality of surfaces, or no function element may be disposed on any one of the plurality of surfaces. The function element may cover a function area, different function elements may cover different function areas, and different function areas may overlap (including partially overlap and completely overlap), or may be completely staggered.

Specifically, the body 301 includes a first surface 3011 and a second surface 3012. A first function element 3011A is disposed on the first surface 3011. In other words, the first function element 3011A may cover an area. Similarly, a second function element 3012A is disposed on the second surface 3012, and the second function element 3012A may also cover an area. An area covered by a function element may be an area that can be collected by the function element or an area that can be affected by the function element, for example, a sensing area of a sensor, an observable area of a display, a light supplementing area of a supplement light, and an observable area of an atmosphere light. Specifically, a function area covered by a camera generally refers to a range in which the camera can collect an image, and an area covered by a millimeter-wave radar generally refers to a range in which the millimeter-wave radar can perform detection. A range and a location covered by a function element are determined by a pose of the function element. When the pose of the function element is fixed, a range and a location covered by the function element generally remain unchanged. When the pose of the function element changes, for example, rotation, lifting and lowering, or flipping, the range and the location covered by the function element change with an orientation and the pose of the function element. In this embodiment of this application, the pose information includes location information and posture information, for example, a tilt angle and a rotation angle. The function element disposed on the body 301 may be one or more of components such as an image sensor, a supplement light, an atmosphere light, and a display. The image sensor may be an apparatus such as a camera, for example, an infrared (IR) camera, a color (RGB) camera, a depth-detecting camera, a driver monitor system (DMS) camera, a cockpit monitor system (CMS) camera, a digital video recorder (DVR) camera, an RGB-IR camera, or a radar (such as a millimeter wave radar). The depth-detecting camera may be a time-of-flight (TOF) camera. A function area may be understood as an area used to implement one or more functions. For example, a driver area may be designed as a driving interaction function area, an interior cockpit may be designed as an in-cockpit interaction function area, and a front outside a vehicle may be designed as an out-cockpit interaction function area. Generally, the function area can be designed to a fixed location, which varies with the function.

Only one function element may be disposed on a same surface of the body 301, or a plurality of function elements may be disposed on a same surface of the body 301, where functions and parameters of the plurality of function elements may be the same or may be different. For example, one first function element 3011A may be disposed on the first surface, or a plurality of first function elements 3011A may be disposed on the first surface, or a plurality of function elements with different parameters or a plurality of function elements with different functions may be disposed on the first surface, to meet different requirements of a user in a vehicle control process. Specifically, for example, a camera A and a camera B are disposed on the first surface, and an optical zoom ratio of the camera A is higher than that of the camera B. In this way, different photographing requirements of a user in a use process can be met. For example, a camera and an infrared supplement light are disposed on the first surface. The camera may be configured to collect an image in the cockpit or an image of a user, and the infrared supplement light may be configured to supplement light for a collection object. In this way, during driving at night, precise image collection may be performed even if a lighting light in the cockpit is not turned on, to ensure driving safety.

Same function elements may be disposed on different surfaces of the body 301, or different function elements may be disposed on different surfaces of the body 301. Different function elements may be understood as function elements with different functions, or may be understood as function elements with different parameters. This is not limited in this application. For example, a camera is disposed on the first surface 3011 of the body 301, a radar sensor is disposed on the second surface of the body 301, the camera is configured to monitor a driver, and the radar sensor is configured to monitor a cockpit environment.

Herein, a first function area and a second function area may overlap or be staggered. For example, a first included angle is disposed between the first surface and the second surface, so that when the first function element covers the first function area, the second function element may cover the second function area, and the first function area and the second function area may overlap. Herein, the overlapping may mean that the two function areas partially overlap, or may mean that the two function areas completely overlap. As shown in FIG. 4, the first surface and the second surface may not be connected, and the first included angle may be an included angle between extension surfaces of the first surface and the second surface. To make the two function areas partially overlap, the first included angle may be generally set to an obtuse angle. For example, the first included angle may be set to an angle greater than 135 degrees and less than 160 degrees, for example, 150 degrees or 140 degrees. Alternatively, the first included angle may be set to an angle greater than 140 degrees and less than 150 degrees, for example, 145 degrees. The first included angle is disposed, so that the function area covered by the second function element and the function area covered by the first function element may overlap. Further, the second function element may also cover a part or all of the first function area, to improve effective coverage of the function element, and reduce design costs and implementation difficulties.

In one embodiment, the body 301 may further include a third surface 3013, a third function element 3013A is disposed on the third surface 3013, and the third function element 3013A has a third function area. There may be a second included angle between the second surface and the third surface. The second surface and the third surface may be connected or may not be connected. The second included angle may be an included angle between extension surfaces of the second surface and the third surface.

Figure 5:
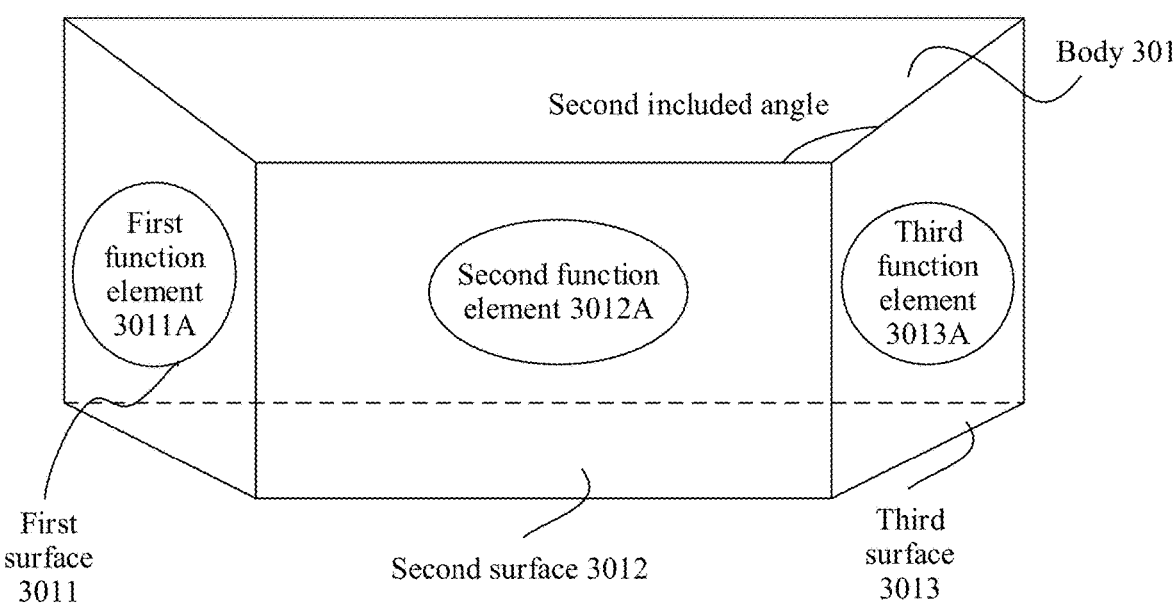
FIG. 5 is a schematic diagram of a structure of an electronic apparatus according to an embodiment of this application.

Refer to FIG. 5. The second included angle may be an obtuse angle less than 180 degrees, and function elements may be separately disposed on the second surface and the third surface. For example, a display is disposed on the second surface, and a camera is disposed on the third surface. The first included angle and the second included angle may be the same, so that the electronic apparatus 30 may be designed as a symmetric structure.

Figure 6:
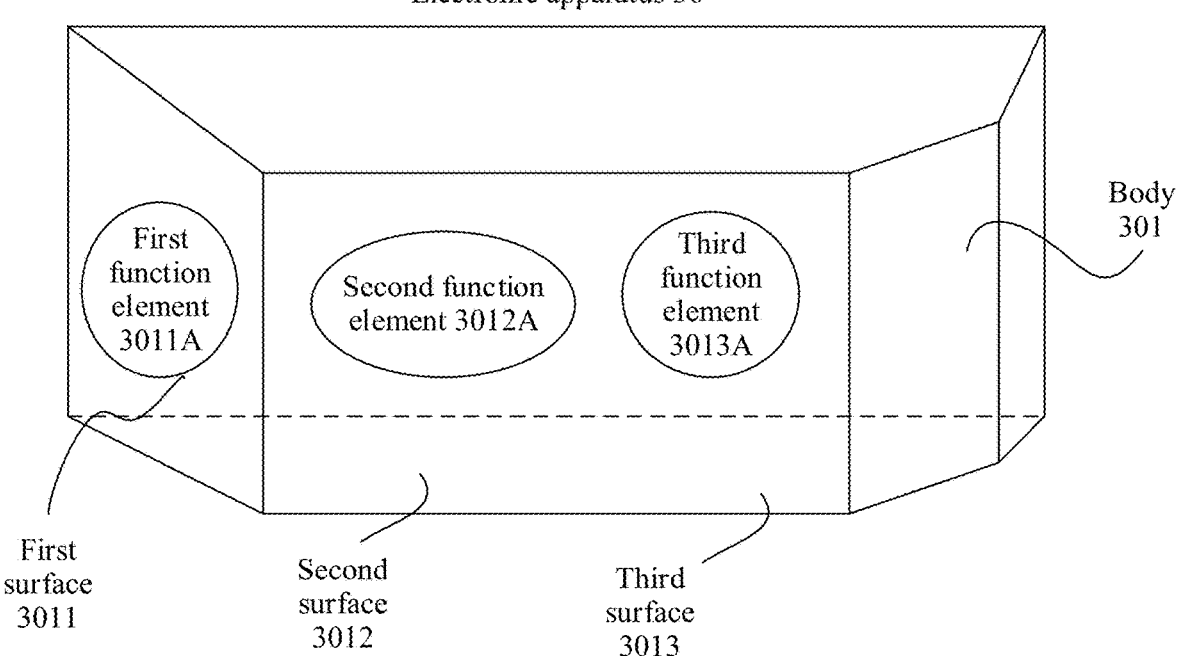
FIG. 6 is a schematic diagram of a structure of an electronic apparatus according to an embodiment of this application.

Refer to FIG. 6. When the second included angle is 180 degrees, the second surface and the third surface may overlap, that is, a plurality of function elements including the second function element and the third function element are disposed on the second surface. The second function area and the third function area overlap. For example, the second surface and the third surface are connected, that is, a plurality of function elements are disposed on the second surface, including a camera with an optical zoom ratio of 30 and a camera with an optical zoom ratio of 50. The cameras cover a same function area.

In one embodiment, the body 301 may further include a fourth surface 3014, a fourth function element 3014A is disposed on the fourth surface 3014, the fourth function element 3014A has a fourth function area, and there may be a third included angle between the fourth surface and the second surface. It may be understood that the fourth surface and the second surface may be connected, or may not be connected, and the third included angle may be an included angle between extension surfaces of the second surface and the fourth surface. The fourth included angle may be an acute angle. For example, the fourth included angle is less than 20 degrees, or the fourth included angle is less than 10 degrees. The fourth angle may alternatively be set to an obtuse angle. It should be understood that an example of an angle in this embodiment of this application is merely used for solution explanation, and may alternatively be another value.

Figure 7:
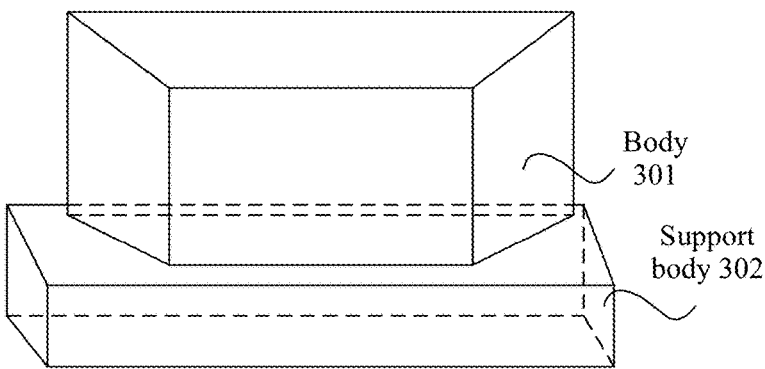
FIG. 7 is a schematic diagram of a structure of an electronic apparatus according to an embodiment of this application.

In one embodiment, refer to FIG. 7. The electronic apparatus 30 may further include a support body 302. The support body 302 may be disposed below the body 301, and is configured to support the body 301. Alternatively, the support body 302 may be disposed above the body 301, and is configured to hang the body 301. Alternatively, the support body 302 may be further disposed inside the body 301. In addition to supporting or hanging the body 301, the support body 302 may be further configured to drive a pose adjustment of a function element in the body 301. The pose adjustment includes one or more of adjustment operations such as rotation, lifting and lowering, tilting forward, or tilting backward. For example, a mechanical structure may be disposed in the support body 302, and is configured to drive a function element in the body 301 to be lifted and lowered or rotated.

Figure 8:
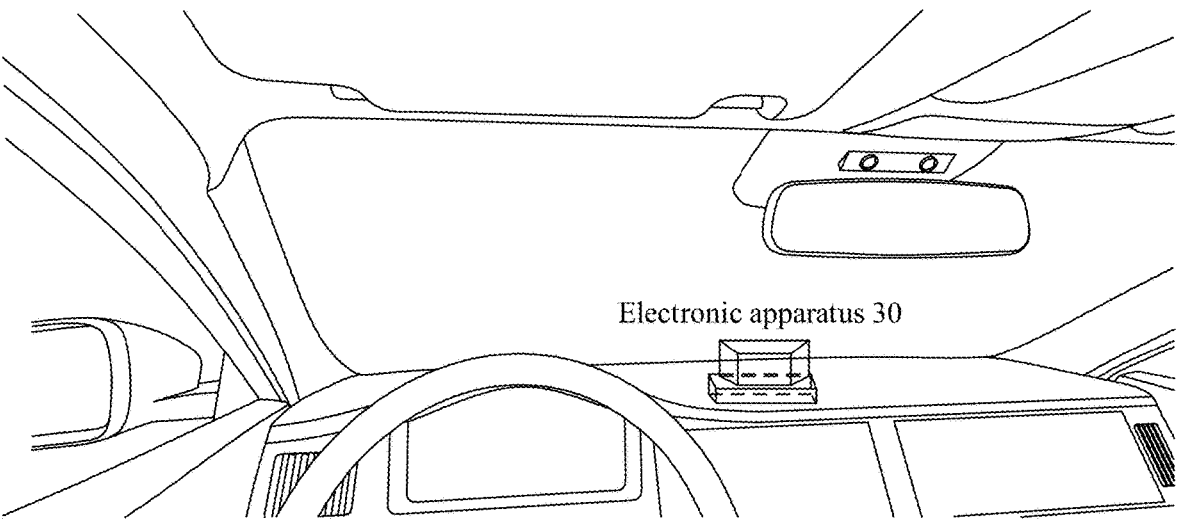
FIG. 8 is an example diagram of an installation location of an electronic apparatus according to an embodiment of this application.
Figures 9, 10:
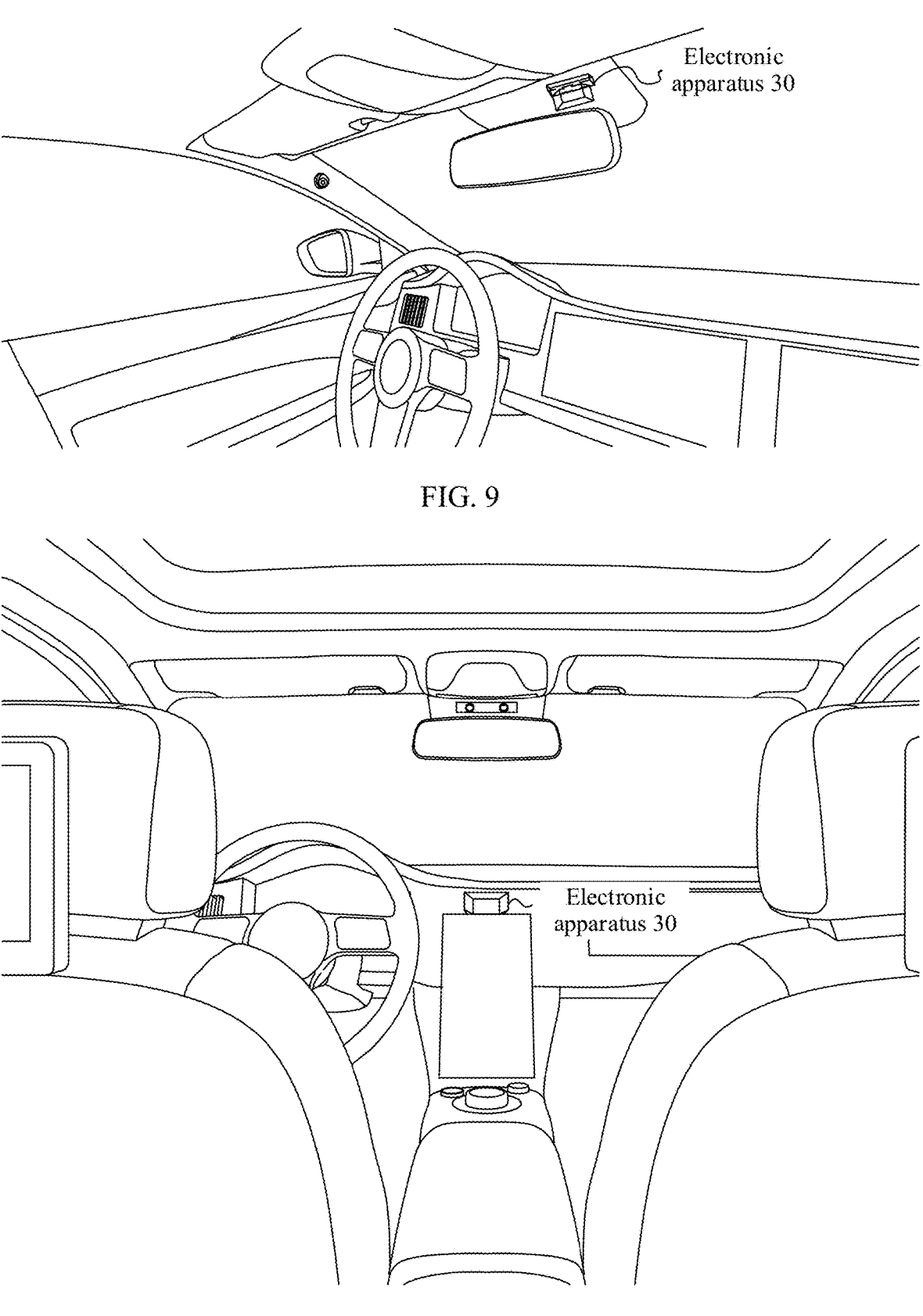
FIG. 9 is an example diagram of an installation location of an electronic apparatus according to an embodiment of this application.
FIG. 10 is an example diagram of an installation location of an electronic apparatus according to an embodiment of this application.

FIG. 8 to FIG. 10 are schematic diagrams of installation locations of several electronic apparatuses according to embodiments of this application.

The support body 302 may be further configured to connect the body 301 to a hardware apparatus in the cockpit, for example, one or more of hardware apparatuses in the cockpit, such as a display, a rear-view mirror, a multimedia device, a central control area (such as a center console), and a dome light. As shown in FIG. 8, the electronic apparatus 30 may be disposed in the central control area of the cockpit. The electronic apparatus may be placed perpendicular to the center console of the cockpit, so that stability is better, or may be tilted at a specific angle, to improve installation flexibility. As shown in FIG. 9, the electronic apparatus 30 may be disposed above in the cockpit, for example, near a rear-view mirror or a dome light area. Refer to FIG. 10. The electronic apparatus 30 may be connected to the central display screen, and set behind the central display screen. It should be understood that structures of the electronic apparatus 30, the body 301, and the support body 302 shown in embodiments of this application are all examples, or may be of other shapes. For example, the support body 302 may be of a cylinder shape, a buckle shape, or the like. It should be understood that the electronic apparatus 30 may be further disposed above the television shown in FIG. 2, and details are not described herein again.

Figure 11:
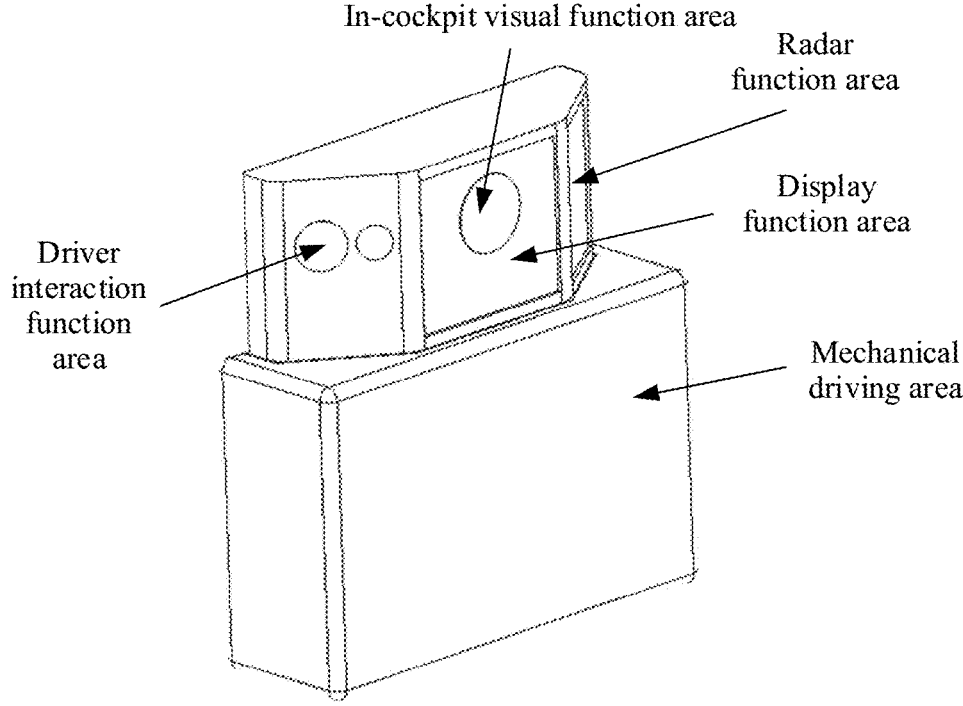
FIG. 11 is a schematic diagram of a structure of an electronic apparatus according to an embodiment of this application.
Figure 12:
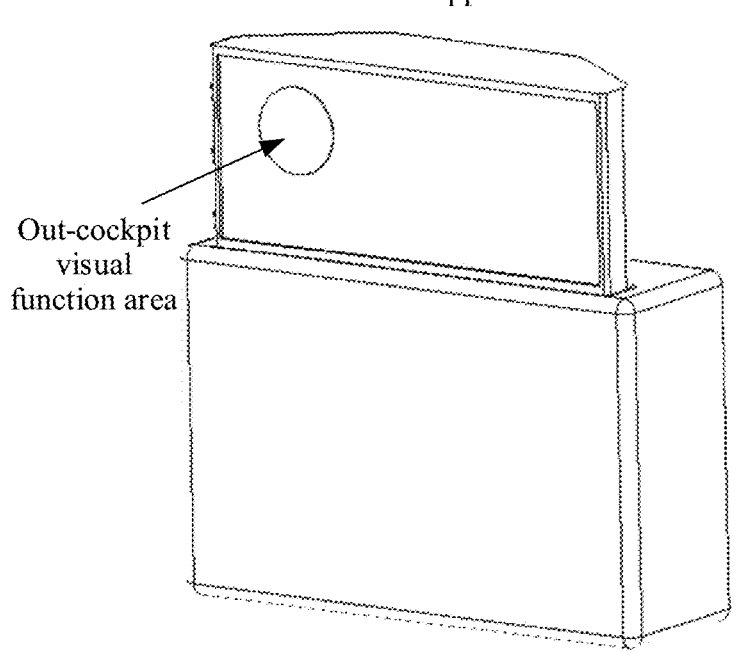
FIG. 12 is a schematic diagram of a structure of an electronic apparatus according to an embodiment of this application.

FIG. 11 is a schematic diagram of a structure of an electronic apparatus according to an embodiment of this application. FIG. 12 is a schematic diagram of a structure of an electronic apparatus according to an embodiment of this application. The electronic apparatus 110 and the electronic apparatus 30 may be a same electronic apparatus. For design details and effective effects, refer to each other. For brevity of description, details are not described in the following.

The electronic apparatus 110 includes one or more of the first surface to the fifth surface. The first surface is used for driver interaction, and is also referred to as a driver interaction function area. The second surface is used to collect image information inside a cockpit, and is also referred to as an in-cockpit visual function area. The third surface is used to collect image information outside the cockpit, and is also referred to as an out-cockpit visual function area. The fourth surface is used for displaying, and is also referred to as a display function area. The fifth surface is used to collect radar information collection, and is also referred to as a radar function area. In addition, the electronic apparatus 110 may further include a mechanical drive apparatus, configured to drive a pose adjustment of the electronic apparatus 110, for example, rotation, lifting and lowering, or flipping. Alternatively, the mechanical drive apparatus may further drive a pose adjustment of a function element in the electronic apparatus 30, or the mechanical drive apparatus may further drive a pose adjustment of one or more of the first surface to the fifth surface in the electronic apparatus 110. Any one of the first surface to the fifth surface may be connected, not connected, overlapped, or not overlapped.

Herein, the driver interaction function area may be configured to implement functions such as driver fatigue detection, driver facial recognition, driver gesture recognition, and driver-line-of-sight interaction by imaging a facial feature, a limb feature, a pupil feature, and the like of a driver. The in-cockpit visual function area may be configured to implement functions such as high-definition photographing, video call, and gesture interaction of a passenger in the cockpit by performing visual imaging on an entire environment in the automobile cockpit. The out-cockpit visual function area is used for visual imaging of an environment outside a vehicle cockpit to implement functions such as HD photographing, HD video recording, and perception of pedestrians and signal lights. The display function area is used for virtual image display, or light status display to implement physical display of a "driving partner" and other functions. The radar function area is integrated with radar to implement functions such as abandoned living body detection and respiration and heartbeat detection of a passenger in the cockpit. The mechanical driving area may be used to implement functions such as lifting and lowering, rotating, and flipping of an entire module by designing a corresponding transmission structure.

A camera such as an RGB-IR camera, an IR camera, or a TOF camera may be used in the driver interaction function area. A camera such as an RGB-IR camera or an IR camera may be used in the in-cockpit visual function area. An RGB camera or a DVR camera may be used in the out-cockpit visual function area. An apparatus such as a breathing light, or a screen may be used in the display function area. An apparatus such as a millimeter wave radar may be used in the radar function area.

Figure 13:
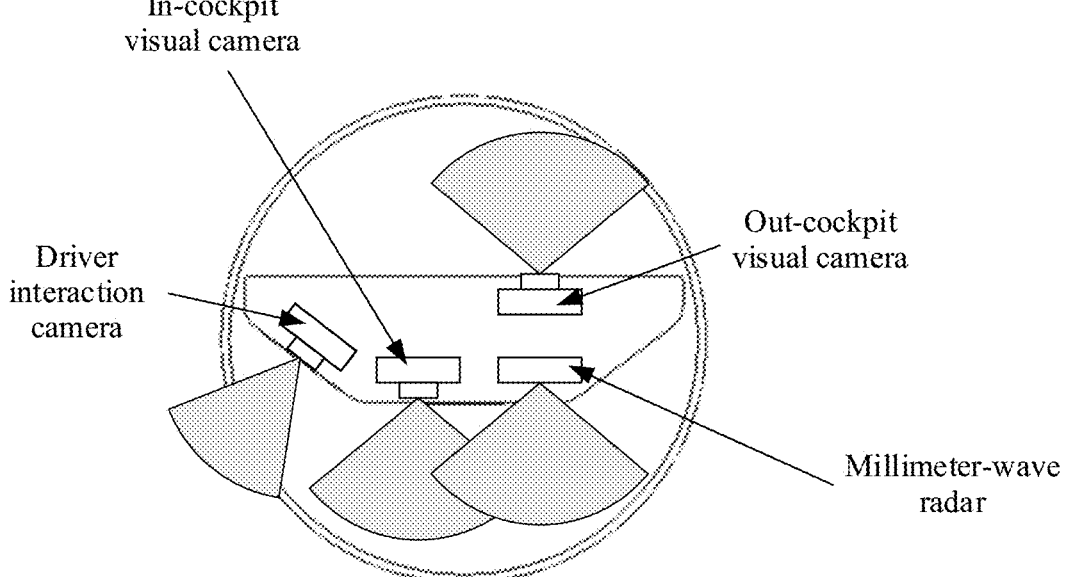
FIG. 13 is a schematic diagram of a structure of an electronic apparatus according to an embodiment of this application.
Figure 14:
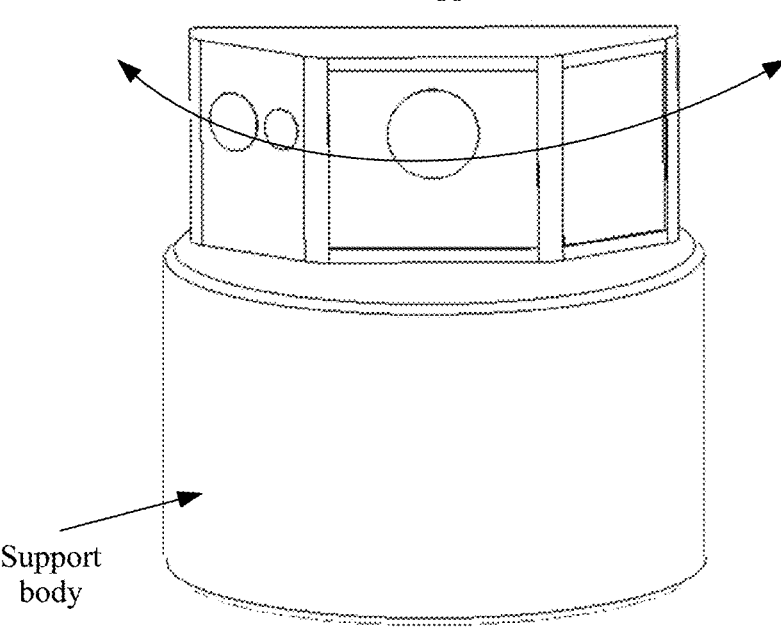
FIG. 14 is a schematic diagram of a structure of an electronic apparatus according to an embodiment of this application.
Figure 15:
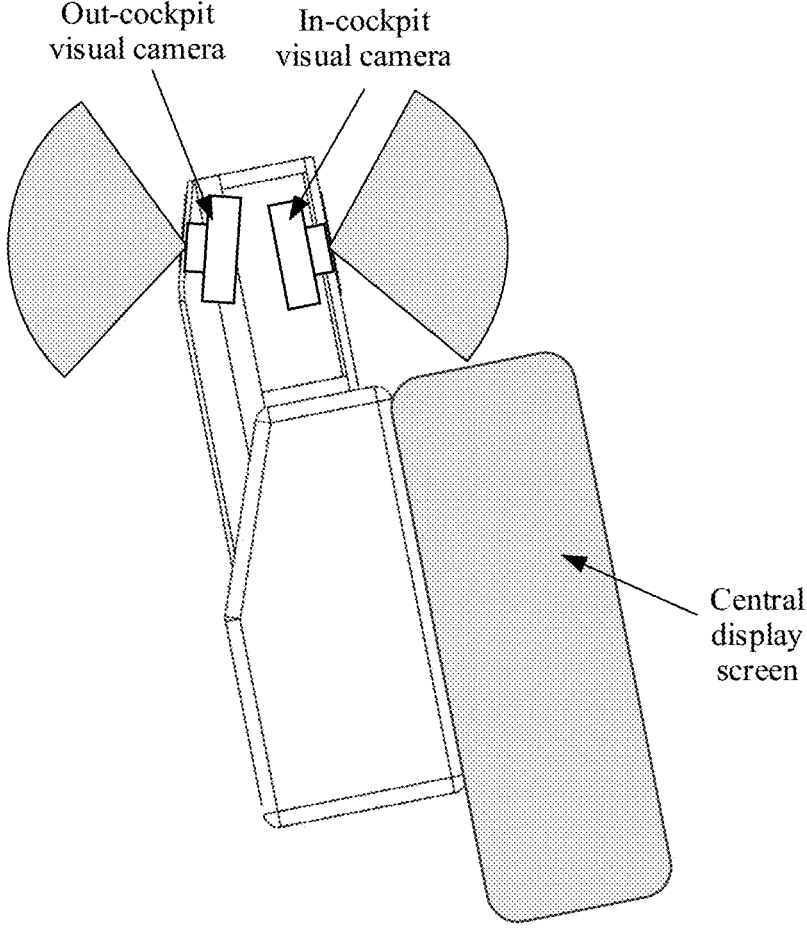
FIG. 15 is a schematic diagram of a structure of an electronic apparatus according to an embodiment of this application.
Figure 16:
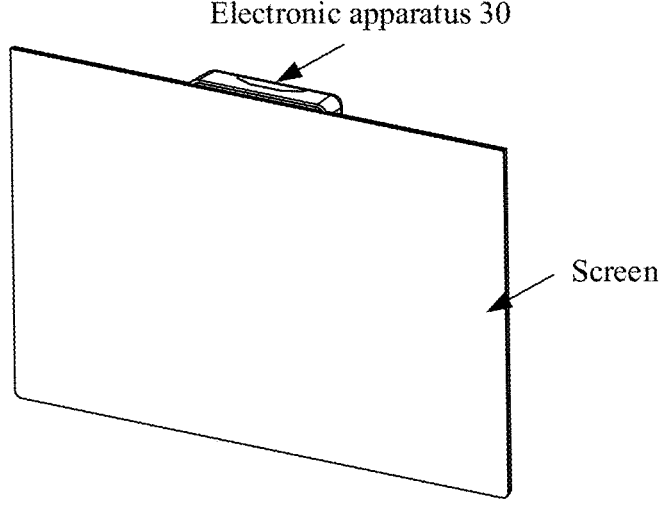
FIG. 16 is an example diagram of using an electronic apparatus according to an embodiment of this application.
Figure 17:
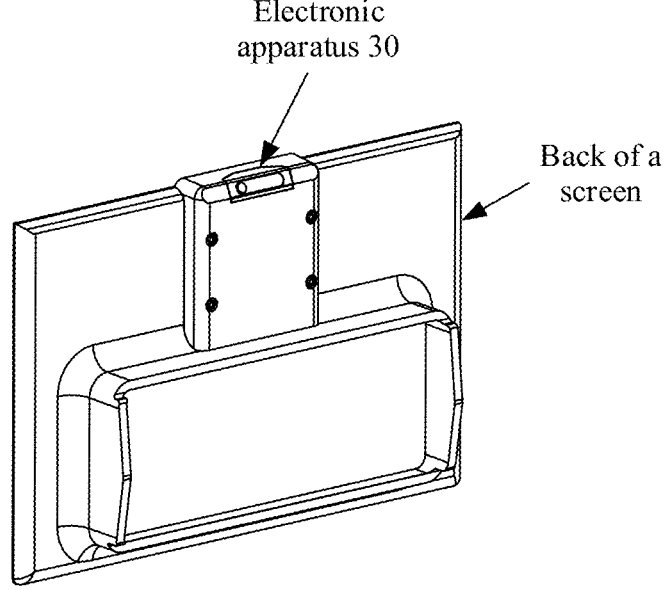
FIG. 17 is an example diagram of using an electronic apparatus according to an embodiment of this application.
Figure 18:
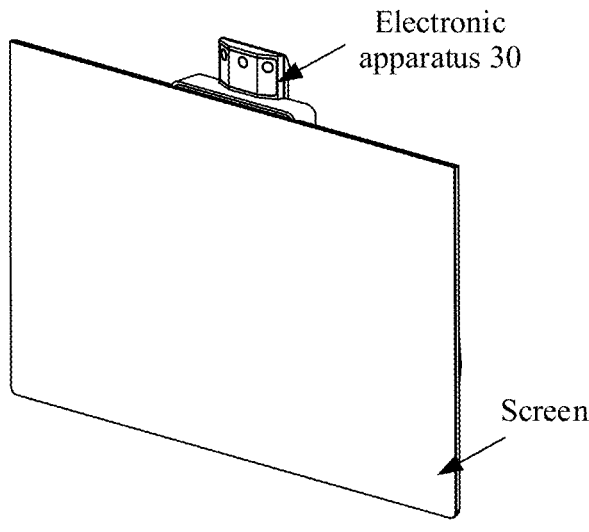
FIG. 18 is an example diagram of using an electronic apparatus according to an embodiment of this application.
Figure 19:
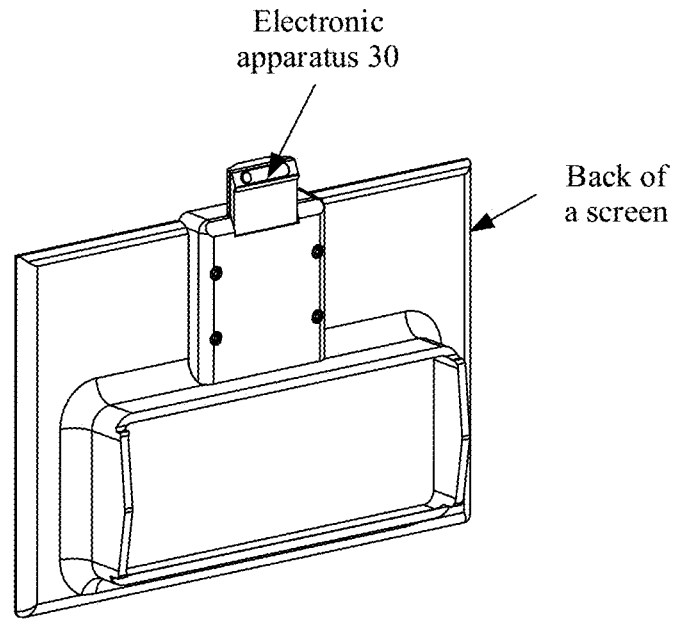
FIG. 19 is an example diagram of using an electronic apparatus according to an embodiment of this application.

To further understand the human-machine interaction solution provided in embodiments of this application, the following provides more specific examples for description. FIG. 13 is a schematic diagram of a structure of an electronic apparatus according to an embodiment of this application. FIG. 14 is a schematic diagram of a structure of an electronic apparatus according to an embodiment of this application. The electronic apparatus 130, the electronic apparatus 150, the electronic apparatus 30, and the electronic apparatus 110 may be a same electronic apparatus. For design details and effective effects, refer to each other. For brevity of description, details are not described in the following.

A body 301 has a first surface 3011, a second surface 3012, a third surface 3013, and a fourth surface 3014. A first function element 3011A is disposed on the first surface 3011, the first function element 3011A is configured to collect image information of a driving area, a second function element 3012A is disposed on the second surface 3012, the second function element 3012A is configured to collect image information of a cockpit area, a third function element 3013A is disposed on the third surface 3013, the third function element 3013A is also configured to collect image information of the cockpit area, a fourth function element 3014A is disposed on the fourth surface 3014, and the fourth function element 3014A is configured to collect image information outside a cockpit. The following uses an example in which the first function element 3011A is a DMS camera, the second function element 3012A is a millimeter-wave radar, the third function element 3013A is a CMS camera, the fourth function element 3014A is a DVR camera, and the second surface and the third surface are a same plane. It should be understood that the foregoing function element may be another component, and this is merely an example herein.

In a possible design, the electronic apparatus 130 is placed perpendicular to a central control area, a body 301 of the electronic apparatus is located above a support body 302, and the support body 302 is connected to the body 301 and a central control area of a cockpit. In a general state, the CMS camera faces inside of the cockpit, and an obtuse angle of 135 degrees to 160 degrees may be formed between a surface on which the DMS camera is located and a surface on which the CMS camera is located. The DMS camera may face a driver direction, and the CMS camera may further collect images of a driver and another user in the cockpit. The optical axis of the CMS camera is parallel to that of the DVR camera. The DVR camera faces the outside of the cockpit and can collect image information outside the cockpit. The millimeter-wave radar and CMS camera are staggered horizontally.

When the user has a requirement for protecting privacy or the vehicle is in a fire-out state, a drive structure in the support body 302 may be used to drive one or more of the foregoing function elements to be lifted and lowered or rotated, to physically block the foregoing function elements such as the camera by using another structure. In a working state of the electronic apparatus, the driving structure in the support body 302 may be used to drive one or more of the foregoing function elements to be lifted and lowered, or rotated, so that the foregoing function elements are exposed and are in an unblocked state. Herein, the support body 302 may be lifted and lowered, or rotated, or the support body 302 may drive the foregoing function elements to be lifted or lowered, or rotated, and a location of the support body 302 remains unchanged. Herein, it should be understood that, pose adjustment of different function elements may be the same, or may be different. Different function elements can be lifted and lowered simultaneously. Alternatively, some function elements can be lifted and lowered, while other function elements remain in original locations. Different function elements can be rotated simultaneously. Alternatively, some function elements can be rotated, and other function elements can remain in original locations or lifted and lowered.

Specifically, for example, when the electronic apparatus 30 does not work, the electronic apparatus 30 may be hidden under a center console to physically block the function element. During working, the electronic apparatus 30 is raised by lifting and lowering. Refer to FIG. 13 and FIG. 14. To easily use space of the center console, the support body 302 may be further designed as a cylindrical structure, and rotation in a horizontal direction is increased, to implement horizontal rotation of an entire hardware structure of the electronic apparatus. A driver interaction camera may be a DMS camera, an in-cockpit visual camera may be a CMS camera, and an out-cockpit visual camera may be an image collection apparatus such as a DVR camera or an RGB camera.

In the working state of the electronic apparatus 30, for example, in a scenario in which a driver performs identity authentication, driver gesture control, or a fatigue detection function, the electronic apparatus 30 may adjust an angle and a location of the DMS camera based on an actual sitting posture of the driver, so that the DMS camera can collect a clearer driver image, thereby improving accuracy and efficiency of data processing. Alternatively, a threshold range may be set, so that the DMS camera is adjusted within the threshold range, to reduce frequent rotation of the electronic apparatus caused by a change of a driver location. In an extreme scenario, for example, in a safety emergency state, to facilitate monitoring of a driver status, a degree of freedom of adjustment may be further reserved. These may be set by a user on a system setting interface or adjusted by using an instruction, for example, adjusted by using a voice instruction or a gesture instruction.

In the working state of the electronic apparatus 30, for example, when a user in a cockpit makes a video call, a function element may be selected to perform photographing. For example, if a camera parameter of the first function element is better than that of the second function element, the first function element may be rotated to the face a photographed object. For example, based on a quantity of people in the cockpit and locations, the location adjustment of function elements is performed, and collected image information is processed. Specifically, for example, when a plurality of people participate in a video call in the cockpit, the DMS camera and the CMS camera may be switched based on a location of a speaking object to perform collection. For example, when a plurality of people take a photo together in the cockpit, to facilitate photographing of all users, the CMS camera may be used for collection. Alternatively, when only the driver is in a video call, to avoid photographing another user and exposing privacy, the DMS camera may be used to collect image information of the driver, and the CMS camera may adjust a pose to perform physical blocking or image shielding.

In the working state of the electronic apparatus 30, for example, when a DVR camera performs photographing outside the cockpit, an optical axis of the DVR camera is generally along a vehicle moving direction by default. When a target outside the cockpit needs to be tracked, a pose of the DVR camera may also be adjusted to track and photograph the target outside the cockpit. Alternatively, after the DVR camera determines an object, a pose of another function element may be adjusted, and the another function element is configured to collect image information of the object. In this way, information precision and collection efficiency can be improved.

In a possible design, the electronic apparatus 30 is connected to the central display screen. For example, the electronic apparatus 30 is disposed behind the central display screen, and forms an included angle of an acute angle with an extension surface of the screen, or even the electronic apparatus 30 may be parallel to the screen. The support body 302 may retain only a lifting and lowering function to reduce a volume of the electronic apparatus 30. The DMS camera, the CMS camera, and the millimeter-wave radar can be deployed vertically in the lifting and lowering direction. Generally, the central display screen is tilted in a vertical direction, and an included angle is formed between the central display screen and the vertical direction. A tilt angle of the DVR camera can be adjusted to ensure that the optical axis of the DVR camera is level with the horizontal direction or is raised at a specific sharp angle. Herein, the central display screen may also be replaced with another electronic screen, for example, a screen such as a digital dashboard or an entertainment screen. In other words, the central display screen may alternatively be located at another location, for example, in front of a driver, in front of a front passenger, or near another passenger.

Similarly, when a user has a privacy protection requirement or the vehicle is in a fire-out state, the electronic apparatus 30 may be hidden behind the central display screen, and physically block and shield the camera by using the central display screen. When the electronic apparatus 30 works, a driving structure of the support body 302 may be used to raise the body 301 to a high level so that the central display screen does not block the function element. When the electronic apparatus 30 does not have a rotation function, an included angle of 145 degrees to 160 degrees may be formed between the first surface and the second surface, so that the DMS camera may face the driver, and better driver area image information is collected.

A camera with a large field of view (FOV) can be used to improve an effective collection range of the function element. For example, the DMS camera may use a camera with an FOV greater than 60 degrees, and similarly, the CMS camera may also use a camera with an FOV greater than 100 degrees, to avoid that information about some objects in the cockpit cannot be collected, and ensure, as much as possible, that all objects in the cockpit are within a field of view of the camera.

Figure 20:
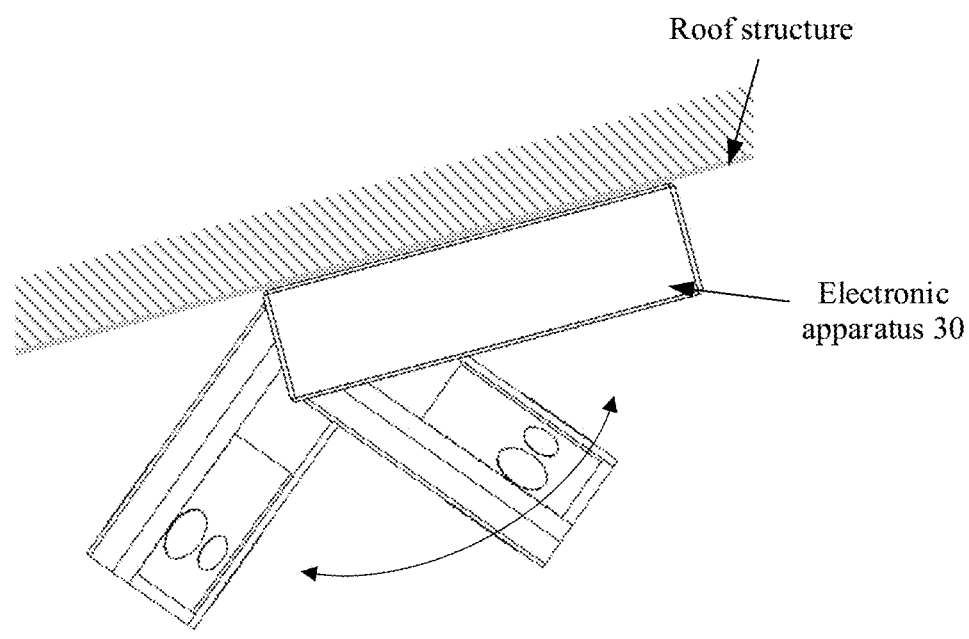
FIG. 20 is an example diagram of an installation location of an electronic apparatus according to an embodiment of this application.

In a possible design, the electronic apparatus 30 may be installed in an upper area in the cockpit. Refer to FIG. 20. The electronic apparatus 30 may use a flipping and lifting and lowering structure, to resolve a problem that space in a vertical direction of an inner rear-view mirror or a dome light position is small. After being horizontally disposed, the electronic apparatus 30 is connected to the dome light and the inner rear-view mirror. When the electronic apparatus 30 is in a non-working state or a privacy state, the electronic apparatus 30 may rotate upward to perform physical recycling shielding. When the electronic apparatus 30 is in a working state, the support body 302 may push out a hardware module of the electronic apparatus 30, and then rotate a mechanism to flip an entire module. If the electronic apparatus 30 is designed not to rotate horizontally, to ensure that the DMS camera can face the driver, an included angle of 20° to 45° also needs to be formed between the DMS camera and the CMS camera, and a larger FOV module is selected, to ensure, as much as possible, that drivers with different heights and sitting postures are within the field of view of the camera. A large FOV module, for example, a camera whose FOV is greater than 100 degrees, may also be selected as the in-cockpit visual camera, so that the entire cockpit is within the field of view of the camera. To enable the in-cockpit visual camera to cover the entire cockpit, an optical axis of a camera generally needs to be horizontally deflected downward by an acute angle, for example, an angle greater than 10 degrees and less than 30 degrees. In a specific implementation process, adjustment may be performed with reference to an installation height. The out-cockpit visual camera may be set to a tilt angle to ensure that an optical axis is parallel to the horizontal plane or slightly tilted to the ground.

In a general state, an optical axis of the CMS camera is horizontally deflected downward by an acute angle, for example, an angle greater than 10 degrees and less than 30 degrees, so that the field of view covers the entire cockpit as much as possible. In the working state of the electronic apparatus 30, for example, in a scenario in which a driver performs identity authentication, driver gesture control, or a fatigue detection function, a vertical flip angle may be adjusted based on an actual sitting posture of a driver, so that the driver is as close as possible to a center of a field of view of a camera, so that the DMS camera can collect a clearer driver image, thereby improving accuracy and efficiency of data processing. Alternatively, a threshold range may be set, so that the DMS camera is adjusted within the threshold range, to reduce frequent rotation of the electronic apparatus caused by a change of a driver location. In an extreme scenario, for example, in a safety emergency state, to facilitate monitoring of a driver status, a degree of freedom of adjustment may be further reserved. These may be set by a user on a system setting interface or adjusted by using an instruction, for example, adjusted by using a voice instruction or a gesture instruction. In the working state of the electronic apparatus 30, for example, when a user in a cockpit makes a video call, a function element may be selected to perform photographing. For example, if a camera parameter of the first function element is better than that of the second function element, the first function element may be rotated to the face a photographed object. For example, based on a quantity of people in the cockpit and locations, the location adjustment of function elements is performed, and collected image information is processed. Specifically, for example, when a plurality of people participate in a video call in the cockpit, the DMS camera and the CMS camera may be switched based on a location of a speaking object to perform collection. For example, when a plurality of people take a photo together in the cockpit, to facilitate photographing of all users, the CMS camera may be used for collection. Alternatively, when only the driver is in a video call, to avoid photographing another user and exposing privacy, the DMS camera may be used to collect image information of the driver, and the CMS camera may adjust a pose to perform physical blocking or image shielding. In the working state of the electronic apparatus 30, for example, when a DVR camera performs photographing outside the cockpit, an optical axis of the DVR camera is generally along a vehicle moving direction by default. When a target outside the cockpit needs to be tracked, a pose of the DVR camera may also be adjusted to track and photograph the target outside the cockpit. Alternatively, after the DVR camera determines an object, a pose of another function element may be adjusted, and the another function element is configured to collect image information of the object. In this way, information precision and collection efficiency can be improved. It should be understood that the out-cockpit visual camera is optional.

Figure 21:
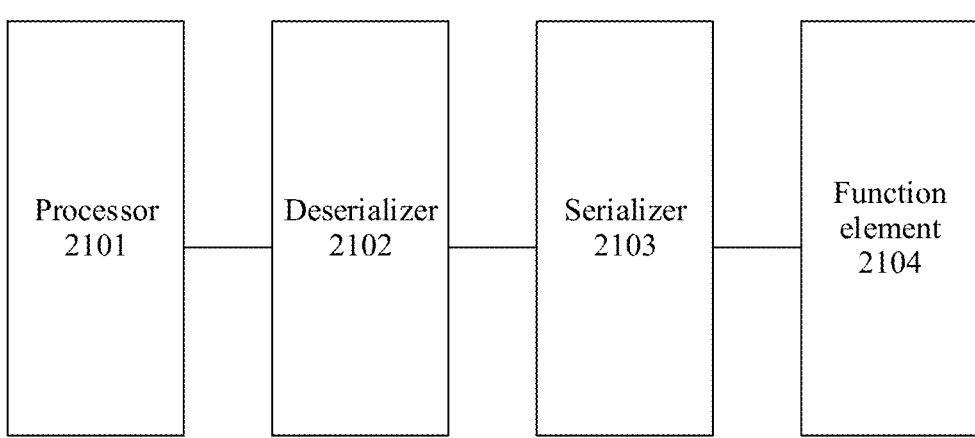
FIG. 21 is a schematic diagram of a structure of a system according to an embodiment of this application.
Figure 22:
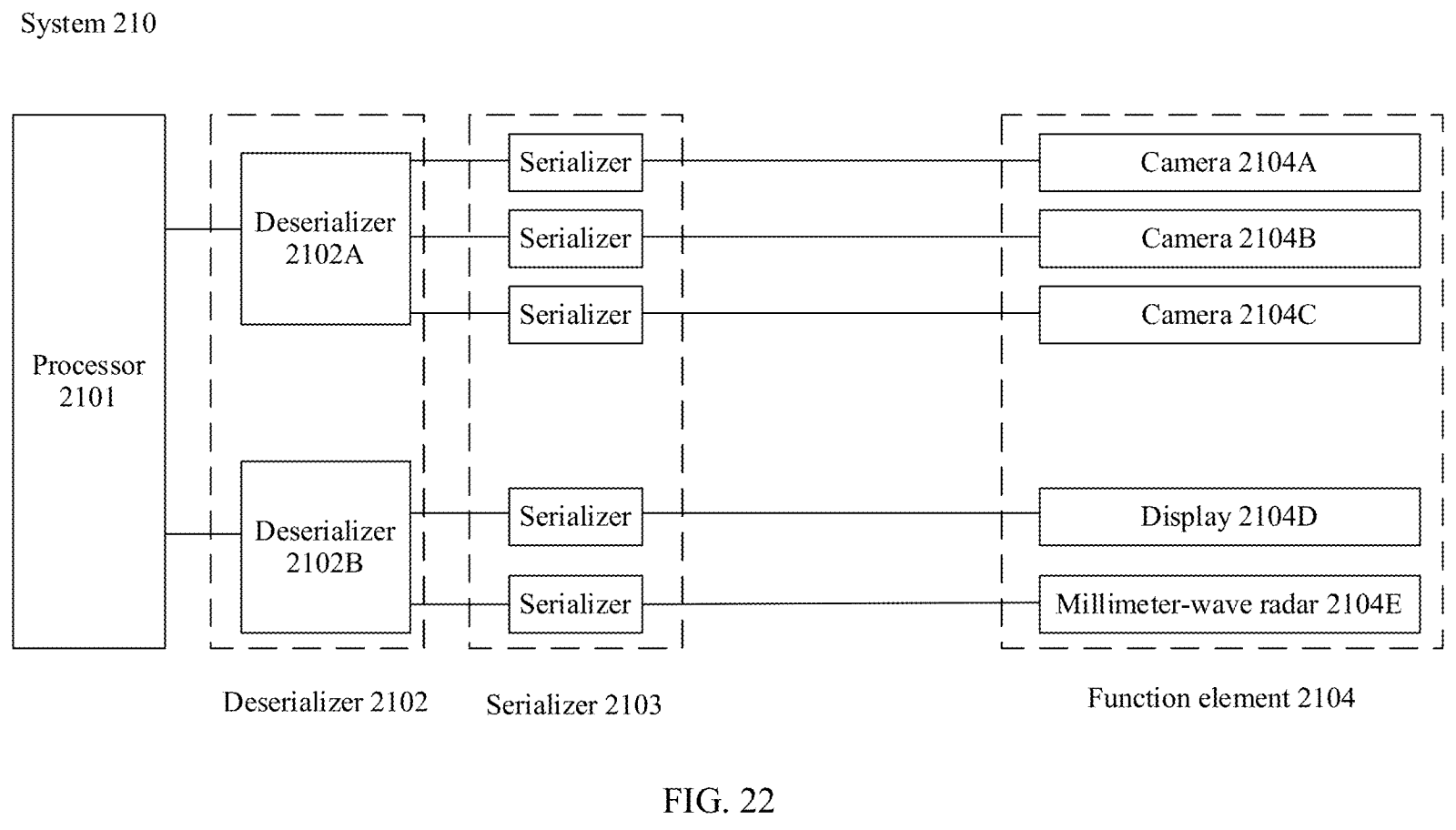
Figure 23:
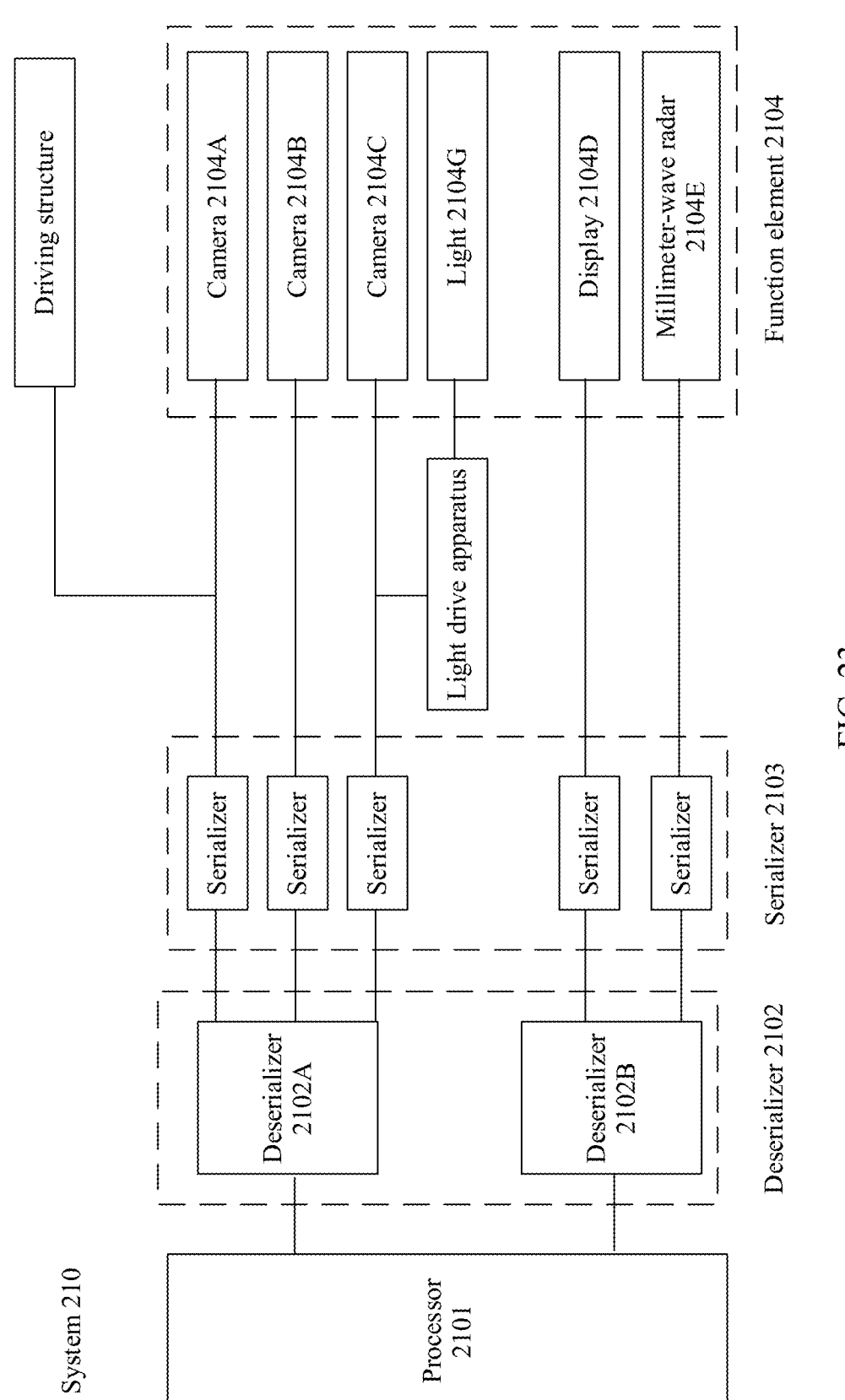
FIG. 23 is a schematic diagram of a structure of a system according to an embodiment of this application.

FIG. 21 to FIG. 23 are schematic diagrams of structures of several systems according to an embodiment of this application. A system 210 may be used for human-machine interaction, or may be referred to as a human-machine interaction system. The system 210 may be any one of an electronic apparatus 30, an electronic apparatus 110, an electronic apparatus 130, and an electronic apparatus 150, or may be a system including any one of the foregoing electronic apparatuses and another electronic apparatus. As shown in FIG. 21, the system 210 includes:

a processor 2101, a deserializer 2102, a serializer 2103, and a function element 2104.

The foregoing components may perform communication in a wired or wireless manner. The processor 2101 is connected to the serializer 2103 by using the deserializer 2102. The processor 2101 may be configured to process information collected by the function element. The processor 2101 may be one processor or may be a plurality of processors, and may be integrated on one system chip (SoC), or may be distributed on different chips. The processor 2101 herein may be a processor in a head unit, or may be a processor of the electronic apparatus 30. For example, the processor 2101 is a processor of the electronic apparatus 30, and the head unit is connected to the system 210 by using a cable, to supply power and transmit data to the system. The function element 2104 includes one or more of a first function element, a second function element, a third function element, and a fourth function element. A plurality of function elements may use a same serializer or different serializers. Similarly, the plurality of function elements may use a same deserializer or different deserializers. For example, refer to FIG. 22. The system 210 may be further connected to a display 2104D through an input/output interface of the serializer, to implement data transmission with a display apparatus. The system 210 may be further connected to a millimeter-wave radar 2104E through the input/output interface of the serializer, to implement data transmission with the millimeter-wave radar. Different cameras may be connected to a same deserializer after matching by using different serializers, to implement transmission of image data streams of a plurality of cameras and time sequence synchronization between the cameras. Strong time sequence synchronization is not required between the display and the image data streams of the cameras. Different serializers may be used for matching, and the serializers are connected to different deserializers for deserialization.

Refer to FIG. 23. The system 210 may further connect an input/output interface of a serializer to a drive control apparatus, to control a drive apparatus. The input/output interface of the serializer may be a bidirectional two-wire synchronous serial bus interface, which is also referred to as an IIC interface or an I2C interface. The drive apparatus may be disposed in a support body 302, the drive control apparatus may be a motor drive apparatus (for example, a motor drive chip), and the drive apparatus may be a motor. The system 210 may further control a light 2104G by connecting an input/output interface of a serializer to a light drive apparatus, where the light may be an atmosphere light (also referred to as a breathing light), and the light may be a monochromatic or multi-color light emitting diode (LED), and a display frequency of the light may be related to a user operation.

Figure 24:
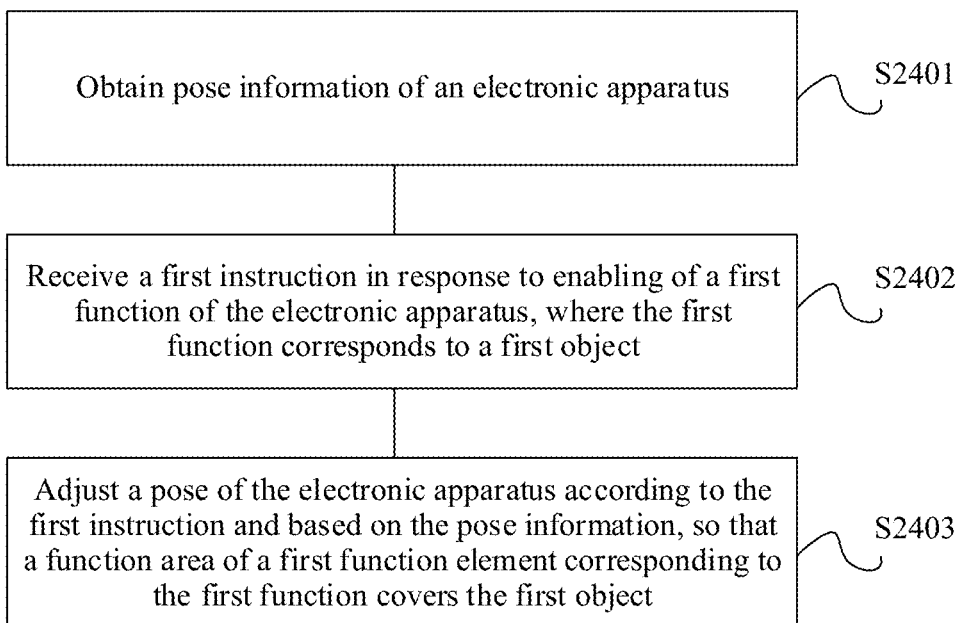
FIG. 24 is a schematic flowchart of a control method according to an embodiment of this application.

FIG. 24 is a schematic flowchart of a control method according to an embodiment of this application. The control method may be executed by a control apparatus, for example, a processor or a processing chip. The control apparatus may be disposed in a head unit or an electronic apparatus, or may be disposed independently. The control method may be used to control an electronic apparatus, such as any one of the electronic apparatuses described above, the electronic apparatus 30 to the electronic apparatus 150.

The control method 240 includes the following operations:

S2401: Obtain pose information of an electronic apparatus.

Herein, the pose information may be a location and a posture (for example, a height, a rotation angle, or a tilt angle) of the electronic apparatus, and may be determined by a sensing apparatus, or may be sent by an electronic apparatus to the control apparatus.

S2402: Receive a first instruction in response to enabling of a first function of the electronic apparatus, where the first function corresponds to a first object.

S2403: Adjust a pose of the electronic apparatus according to the first instruction and based on the pose information, so that a function area of a first function element corresponding to the first function covers the first object.

The electronic apparatus may have a plurality of functions, and receives the first instruction as one or more of the functions are enabled. The first instruction may be a voice instruction, a gesture instruction, a touch instruction, a button instruction, or the like. For example, a voice control function is enabled, and a voice instruction sent by a user is received, where the voice instruction instructs the electronic apparatus to photograph a driver in a cockpit. The control apparatus finds, according to the voice instruction and based on a current location of the electronic apparatus, that a camera on the electronic apparatus cannot take an image of the driver in the cockpit or can only take a picture of a part of the driver in the cockpit. In this case, a location of the electronic apparatus may be adjusted, so that a function area of the camera corresponding to a photographing function covers the driver in the cockpit.

In one embodiment, the first function further corresponds to a second object. The pose of the electronic apparatus is adjusted according to the first instruction and based on the pose information, so that the function area of the first function element corresponding to the first function covers the first object and the second object. For example, a voice control function is enabled, and a voice instruction sent by a user is received. The voice instruction instructs the electronic apparatus to photograph all users in the cockpit, including a driver and a rear passenger. The control apparatus finds, according to the voice instruction and based on a current pose of the electronic apparatus, that the camera on the electronic apparatus can only take an image of some users in the cockpit. In this case, the pose of the electronic apparatus may be adjusted, so that the function area of the camera corresponding to the photographing function covers all users in the cockpit.

In one embodiment, the first function further corresponds to a second function element. The pose of the electronic apparatus is adjusted according to the first instruction and based on the pose information, so that the function area of the first function element corresponding to the first function covers the first object, and a function area of the second function element covers the first object. For example, a user payment function is enabled, and a confirmation instruction sent by the user is received. The confirmation instruction instructs the electronic apparatus to verify a user identity. In a verification process, image information of the user needs to be collected by using a camera, and gesture information of the user needs to be collected by using a millimeter-wave radar. In this case, a location of the electronic apparatus may be adjusted according to the confirmation instruction and based on the pose information of the electronic apparatus, so that a function area that is of the camera and the millimeter-wave radar and that corresponds to the payment function covers the user.

Figure 25:
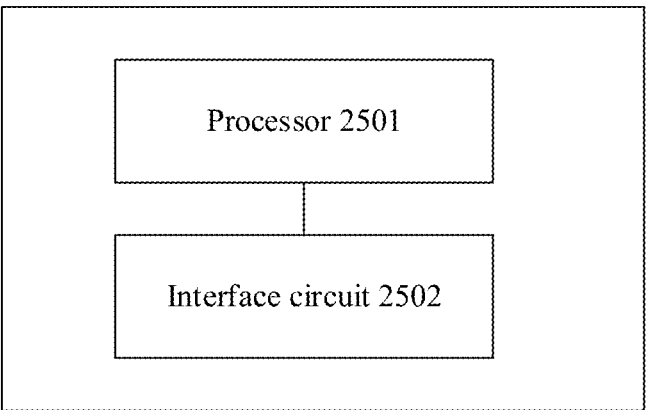
FIG. 25 is a schematic diagram of a structure of a control apparatus according to an embodiment of this application.

FIG. 25 is a schematic diagram of a structure of a control apparatus according to an embodiment of this application. It should be understood that only one processor and one interface circuit are shown in FIG. 25. The image processing apparatus 2500 may include another quantity of processors and interface circuits. The control apparatus may be a processor or a processing chip, and may be disposed in a head unit or an electronic apparatus, or may be disposed independently. The interface circuit 2502 is configured to communicate with another component of, for example, a memory or another processor. The processor 2501 is configured to perform signal interaction with another component through the interface circuit 2502. The interface circuit 2502 may be an input/output interface of the processor 2501.

For example, the processor 2501 reads, through the interface circuit 2502, a computer program or instructions in a memory coupled to the processor 2501, and decodes and executes the computer program or the instructions. It should be understood that, the computer program or the instruction may include a function program of the foregoing control method. When the corresponding function program is decoded and executed by the processor 2501, the electronic apparatus may implement the solutions provided in embodiments of this application.

In one embodiment, these function programs are stored in an external memory. When the function programs are decoded and executed by the processor 2501, the memory temporarily stores some or all content of the function programs.

In one embodiment, these terminal function programs are stored in a memory in a control apparatus 2500. When a memory in the control apparatus 2500 stores a function program, the control apparatus 2500 may be disposed in the head unit or the electronic apparatus in embodiments of the present application.

In one embodiment, some content of the terminal function programs is stored in a memory outside the image processing apparatus 2500, and other content of the terminal function programs is stored in the memory inside the image processing apparatus 2500.

It should be understood that the electronic apparatuses shown in any one of FIG. 3 to FIG. 23 may be combined with each other. For related design details of the optional embodiments, refer to each other, or refer to the electronic apparatus shown in any one of FIG. 24 and related design details of the optional embodiments. Details are not described herein again.

It should be understood that division into units in the apparatus is merely logical function division. During actual implementation, all or some of the units may be integrated into one physical entity or may be physically separated. In addition, a unit in the apparatus may be implemented in a form of a processor invoking software. For example, the apparatus includes a processor, the processor is connected to a memory, the memory stores instructions, and the processor invokes the instructions stored in the memory, to implement any one of the foregoing method or functions of units in the apparatus. The processor is, for example, a general purpose processor, for example, a central processing unit (CPU) or a microprocessor, and the memory is a memory in the apparatus or a memory outside the apparatus. Alternatively, a unit in the apparatus may be implemented in a form of a hardware circuit, and functions of some or all units may be implemented by designing the hardware circuit. The hardware circuit may be understood as one or more processors. For example, in an implementation, the hardware circuit is an application-specific integrated circuit (ASIC), and functions of some or all units are implemented by designing a logical relationship between elements in the circuit. For another example, in another implementation, the hardware circuit may be implemented by using a programmable logic device (PLD), using a field programmable gate array (FPGA) as an example, the field programmable gate array may include a large quantity of logic gate circuits, and a connection relationship between the logic gate circuits is configured by using a configuration file, to implement functions of some or all of the foregoing units. All the units of the foregoing apparatus may be implemented in a form of software invoked by a processor, or may be implemented in a form of a hardware circuit, or some of the units are implemented in a form of software invoked by a processor, and the remaining units are implemented in a form of a hardware circuit.

In this embodiment of this application, the processor is a circuit having a signal processing capability. In an implementation, the processor may be a circuit having an instruction reading and running capability, for example, a CPU, a microprocessor, a graphics processing unit (GPU) (which may be understood as a microprocessor), or a digital signal processor (DSP). In another implementation, the processor may implement a specific function by using a logical relationship of a hardware circuit, and the logical relationship of the hardware circuit is fixed or may be reconstructed. For example, the processor is an application-specific integrated circuit (ASIC), or a hardware circuit implemented by a programmable logic device (PLD), such as an FPGA. In a reconfigurable hardware circuit, a process in which the processor loads a configuration file to implement hardware circuit configuration may be understood as a process in which the processor loads instructions to implement functions of some or all of the foregoing units. In addition, the circuit may be a hardware circuit designed for artificial intelligence, and may be understood as an ASIC, for example, a neural network processing unit (NPU), a tensor processing unit (TPU), or a deep learning processing unit (DPU).

It can be learned that the units in the foregoing apparatus may be configured as one or more processors (or processing circuits) for implementing the foregoing method, for example, a CPU, a GPU, an NPU, a TPU, a DPU, a microprocessor, a DSP, an ASIC, an FPGA, or a combination of at least two of these processor forms.

In addition, all or some of the units in the foregoing apparatus may be integrated, or may be implemented independently. In an implementation, these units are integrated together and implemented in a form of an SOC. The SOC may include at least one processor, configured to implement any one of the foregoing method or implement functions of units of the apparatus. Types of the at least one processor may be different, for example, include a CPU and an FPGA, a CPU and an artificial intelligence processor, a CPU and a GPU, and the like.

In embodiments of this application, prefix words such as "first" and "second" are used only to distinguish between different described objects, and have no limitation on a location, a sequence, a priority, a quantity, content, or the like of the described objects. For example, a "first device" is used as an example, and there may be one or more "devices". In addition, objects modified by different prefix words may be the same or different. For example, if the described object is "device", "first device" and "second device" may be devices of a same type or devices of different types. For another example, if the described object is "information", "first information" and "second information" may be information of same content or information of different content. In conclusion, in embodiments of this application, use of a prefix word such as an ordinal number used to distinguish a described object does not constitute a limitation on the described object. For a description of the described object, refer to the description of the context in the claims or the embodiments, and use of such a prefix word should not constitute an unnecessary limitation. In the embodiments of this application, "a plurality of" refers to two or more. In embodiments of this application, the term "and/or" describes an association relationship for describing associated objects and represents that there may be three relationships. For example, A and/or B may represent the following three cases: Only A exists, both A and B exist, and only B exists. A description manner such as "one or more of a1, a2, . . . , and an" used in embodiments of this application includes a case in which any one of a1, a2, . . . , and an exists alone, and also includes any combination of any multiple of a1, a2, . . . , and an. Each case may exist alone. For example, a description manner of "one or more of a, b, and c" includes a case of a single a, a single b, a single c, a combination of a and b, a combination of a and c, a combination of b and c, or a combination of a, b, and c. In embodiments of this application, a "connection" may be a direct connection or an indirect connection. In addition, the "connection" may be an electrical connection or a communication connection. For example, that two electrical elements A and B are connected may mean that A and B are directly connected, or may mean that A and B are indirectly connected by using another electrical element or a connection medium, so that electrical signals can be transmitted between A and B. For another example, that two devices A and B are connected may mean that A and B are directly connected, or may mean that A and B are indirectly connected by using another communication device or communication medium, provided that A and B can communicate with each other. In embodiments of this application, unless otherwise stated or there is a logic conflict, terms and/or descriptions between the embodiments are consistent and may be mutually referenced, and technical features in different embodiments may be combined based on an internal logical relationship thereof, to form a new embodiment. In this embodiment of this application, the first included angle is less than A and greater than B, or the first included angle is less than or equal to A and greater than B, or the first included angle is less than or equal to A and greater than or equal to B, or the first included angle is less than or equal to A and greater than or equal to B. An endpoint value may be selected based on a requirement in an implementation process.

All or some of the foregoing embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable or an optical fiber) or wireless (for example, infrared, radio, or microwave) manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; may be an optical medium, for example, a DVD; or may be a semiconductor medium, for example, a solid state disk (SSD).

In embodiments of this application, the memory is a device or a circuit that has a data or information storage capability, and may provide instructions and data for the processor. The memory includes a read-only memory (ROM), a random access memory (RAM), a non-volatile random access memory (NVRAM), a programmable read-only memory, an electrically erasable programmable memory, a register, or the like.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic apparatus, comprising:
a body comprising a first surface and a second surface, wherein
a first function element is disposed on the first surface, and a second function element is disposed on the second surface, wherein the first function element performs a first function and the second function element performs a second function; and
there is a first included angle between the first surface and the second surface, so that when the first function element covers a first function area used to perform the first function, the second function element covers a second function area used to perform the second function,
wherein the first function element and the second function element are image collection apparatuses, the first function element is configured to collect image information of a driver area, and the second function element is configured to collect image information of a cockpit,
wherein the body further comprises a third surface, a third function element is disposed on the third surface, the third function element covers a third function area, and the second function area and the third function area overlap,
wherein the support body is configured to drive a pose adjustment of a function element on the body, so that the first function area covers the driver area and the second function area covers the cockpit.

2. The electronic apparatus according to claim 1, wherein the first included angle is greater than 145 degrees and less than 160 degrees.

3. The electronic apparatus according to claim 1, wherein a third function element is further disposed on the second surface, the third function element covers a third function area, and the second function area and the third function area overlap.

4. The electronic apparatus according to claim 1, wherein the body further comprises a fourth surface, a fourth function element is disposed on the fourth surface, an included angle between extension lines of the fourth surface and the second surface is an acute angle, and the fourth function element is configured to collect image information outside a cockpit.

5. The electronic apparatus according to claim 1, further comprising a support body configured to connect the body to a hardware apparatus in a cockpit.

6. The electronic apparatus according to claim 5, wherein the support body is further configured to drive, in a privacy mode, the first function element and the second function element to fall.

7. The electronic apparatus according to claim 5, wherein the support body is further configured to drive the first function element and the second function element to fall when a vehicle is turned off.

8. The electronic apparatus according to claim 1, wherein a human-machine interaction apparatus is disposed in an upper area of the cockpit, and an included angle between an optical axis of the second function element and a horizontal line is greater than 10 degrees and less than 30 degrees.

9. The electronic apparatus according to claim 1, wherein a field of view (FOV) of the first function element is greater than 60 degrees, and an FOV of the second function element is greater than 100 degrees.

10. The electronic apparatus according to claim 1, further comprising a blocking structure configured to block the first function element and the second function element.

11. A control method, comprising:

obtaining pose information of an electronic apparatus;

receiving a first instruction in response to enabling of a first function of the electronic apparatus, wherein the first function corresponds to a first object and the first instruction instructs the electronic apparatus to perform the first function; and adjusting a pose of the electronic apparatus according to the first instruction and based on the pose information, so that a function area of a first function element corresponding to the first function covers the first object, wherein the first function further corresponds to a second object; and wherein the adjusting the pose of the electronic apparatus according to the first instruction and based on the pose information, so that the function area of the first function element corresponding to the first function covers the first object comprises:

adjusting the pose of the electronic apparatus according to the first instruction and based on the pose information, so that the function area of the first function element corresponding to the first function covers the first object and the second object.

12. The control method according to claim 11, wherein the first function further corresponds to a second function element, and wherein the adjusting the pose of the electronic apparatus according to the first instruction and based on the pose information, so that the function area of the first function element corresponding to the first function covers the first object comprises:

adjusting the pose of the electronic apparatus according to the first instruction and based on the pose information, so that the function area of the first function element corresponding to the first function covers the first object, and a function area of the second function element covers the first object.

13. A non-transitory computer storage medium, comprising computer instructions, wherein when the computer instructions are run on an electronic device, the electronic device is enabled to perform operations, the operations including:

obtaining pose information of an electronic apparatus;

receiving a first instruction in response to enabling of a first function of the electronic apparatus, wherein the first function corresponds to a first object and the first instruction instructs the electronic apparatus to perform the first function; and adjusting a pose of the electronic apparatus according to the first instruction and based on the pose information, so that a function area of a first function element corresponding to the first function covers the first object, wherein the first function further corresponds to a second object; and wherein the adjusting the pose of the electronic apparatus according to the first instruction and based on the pose information, so that the function area of the first function element corresponding to the first function covers the first object comprises:

adjusting the pose of the electronic apparatus according to the first instruction and based on the pose information, so that the function area of the first function element corresponding to the first function covers the first object and the second object.

14. The non-transitory computer storage medium according to claim 13, wherein the first function further corresponds to a second function element, and wherein the adjusting the pose of the electronic apparatus according to the first instruction and based on the pose information, so that the function area of the first function element corresponding to the first function covers the first object comprises:

adjusting the pose of the electronic apparatus according to the first instruction and based on the pose information, so that the function area of the first function element corresponding to the first function covers the first object, and a function area of the second function element covers the first object.

* * * * *